(12) United States Patent
Tsutagawa et al.

(10) Patent No.: US 12,103,076 B2
(45) Date of Patent: Oct. 1, 2024

(54) THREE-DIMENSIONAL POWDER BED FUSION ADDITIVE MANUFACTURING APPARATUS AND THREE-DIMENSIONAL POWDER BED FUSION ADDITIVE MANUFACTURING METHOD

(71) Applicant: JEOL Ltd., Tokyo (JP)

(72) Inventors: Nari Tsutagawa, Tokyo (JP); Takashi Sato, Tokyo (JP); Yohei Daino, Tokyo (JP); Kozo Koiwa, Tokyo (JP); Yuhei Kaneko, Tokyo (JP); Masahiko Kawakami, Tokyo (JP)

(73) Assignee: JOEL Ltd., Tokyo (JP)

( * ) Notice: Subject to any disclaimer, the term of this patent is extended or adjusted under 35 U.S.C. 154(b) by 151 days.

(21) Appl. No.: 17/865,632

(22) Filed: Jul. 15, 2022

(65) Prior Publication Data
US 2023/0014614 A1 Jan. 19, 2023

(30) Foreign Application Priority Data
Jul. 16, 2021 (JP) .................................. 2021-117794

(51) Int. Cl.
*B22F 10/362* (2021.01)
*B22F 10/28* (2021.01)
(Continued)

(52) U.S. Cl.
CPC ............ *B22F 10/362* (2021.01); *B22F 10/28* (2021.01); *B22F 10/366* (2021.01); *B22F 12/41* (2021.01);
(Continued)

(58) Field of Classification Search
CPC ...... B22F 10/28; B22F 10/362; B22F 10/364; B22F 10/366; B22F 12/30; B22F 12/38;
(Continued)

(56) References Cited

U.S. PATENT DOCUMENTS 8,187,521 B2 * 5/2012 Larsson .................. B22F 10/28
264/485
2010/0007062 A1 1/2010 Larsson et al.
(Continued)

FOREIGN PATENT DOCUMENTS

CN 107755696 A 3/2018
FR 2984778 A1 6/2013
(Continued)

OTHER PUBLICATIONS

Translation of CN107755696 (Year: 2018).*
(Continued)

*Primary Examiner* — Dana Ross
*Assistant Examiner* — Joseph W Iskra
(74) *Attorney, Agent, or Firm* — The Webb Law Firm

(57) ABSTRACT

An apparatus includes a build plate, a powder application apparatus that applies metal powder onto the build plate to form a powder layer, a beam irradiation apparatus that irradiates the powder layer with an electron beam, and a control unit that controls the powder application apparatus and the beam irradiation apparatus. When the powder layer is preheated by irradiation with the electron beam, the control unit sets a beam size and an irradiation position of the electron beam such that lines of the electron beam do not overlap each other at least at a start of preheating, and controls the beam irradiation apparatus to gradually increase at least one of a beam current and the beam size of the electron beam from the start of preheating to an end of preheating.

12 Claims, 12 Drawing Sheets

(51) Int. Cl.
*B22F 10/366* (2021.01)
*B22F 12/41* (2021.01)
*B22F 12/49* (2021.01)
*B22F 12/50* (2021.01)
*B33Y 10/00* (2015.01)
*B33Y 30/00* (2015.01)

(52) U.S. Cl.
CPC .............. *B22F 12/49* (2021.01); *B22F 12/50* (2021.01); *B33Y 10/00* (2014.12); *B33Y 30/00* (2014.12)

(58) Field of Classification Search
CPC .......... B22F 12/41; B22F 12/49; B22F 12/50; B22F 2999/00; B33Y 10/00; B33Y 30/00; B33Y 50/02; Y02P 10/25
USPC ..................................................... 219/121.29
See application file for complete search history.

(56) References Cited

U.S. PATENT DOCUMENTS

2017/0095882 A1   4/2017  Mireles et al.
2018/0345374 A1*  12/2018  Snis .................. B22F 12/41
2021/0154764 A1   5/2021  Tsutagawa et al.

FOREIGN PATENT DOCUMENTS

| JP | 2009544501 A | 12/2009 |
| JP | 2015193135 A | 11/2015 |
| JP | 2020157698 A | 10/2020 |
| JP | 202141568 A | 3/2021 |

OTHER PUBLICATIONS

Extended European Search Report issued in EP22184873.2 on Oct. 13, 2022.
Office Action issued in JP2021117794 on Aug. 22, 2023.

* cited by examiner

THREE-DIMENSIONAL POWDER BED FUSION ADDITIVE MANUFACTURING APPARATUS AND THREE-DIMENSIONAL POWDER BED FUSION ADDITIVE MANUFACTURING METHOD

CROSS-REFERENCE TO RELATED APPLICATION

This application claims priority to Japanese Patent Application No. 2021-117794 filed Jul. 16, 2021, the disclosure of which is hereby incorporated by reference in its entirety.

BACKGROUND OF THE INVENTION

Field of the Invention

The present invention relates to a three-dimensional powder bed fusion additive manufacturing (PBF-AM) apparatus and a three-dimensional PBF-AM method.

Description of Related Art

In recent years, a three-dimensional PBF-AM apparatus has been known that irradiates metal powder (powder layer) spread in layers on a build plate with an electron beam to melt and solidify the metal powder, and sequentially stacks the solidified layers by moving the build plate to form a three-dimensional build object (see, for example, JP 2015-193135 A).

In this type of three-dimensional PBF-AM apparatus, a phenomenon may occur in which individual powder particles are charged by irradiation with an electron beam, and powder is scattered in a smoke form by Coulomb repulsive force. This phenomenon is called smoke, and when smoke occurs, it becomes difficult to continue the building work. Therefore, in the three-dimensional PBF-AM apparatus, the generation of smoke is suppressed by preheating the powder layer.

However, in a conventional three-dimensional PBF-AM apparatus, a preheating pattern in which lines of an electron beam with which a powder layer is irradiated overlap each other is adopted, and the powder layer is preheated by irradiating the powder layer with the electron beam according to the preheating pattern. For this reason, electric charges are likely to be accumulated in the powder particles at the time of preheating, and the risk of occurrence of smoke is high. In addition, if a preheating pattern is adopted in which the lines of the electron beam do not overlap each other, the metal powder is locally heated, and thus the temperature of the powder layer becomes uneven.

SUMMARY OF THE INVENTION

The present invention has been made to solve the above problems, and an object of the present invention is to provide a technique capable of reducing a risk of occurrence of smoke and making a temperature distribution of a powder layer uniform.

A three-dimensional PBF-AM apparatus according to the present invention includes a build plate, a powder application apparatus that applies metal powder onto the build plate to form a powder layer, a beam irradiation apparatus that irradiates the powder layer with an electron beam, and a control unit that controls the powder application apparatus and the beam irradiation apparatus. When the powder layer is preheated by irradiation with the electron beam, the control unit sets a beam size and an irradiation position of the electron beam such that lines of the electron beam do not overlap each other at least at a start of preheating, and controls the beam irradiation apparatus to gradually increase at least one of a beam current and the beam size of the electron beam from the start of preheating to an end of preheating.

A three-dimensional PBF-AM method according to the present invention includes, when a powder layer formed by applying metal powder onto a build plate is preheated by irradiation with an electron beam, setting a beam size and an irradiation position of the electron beam such that lines of the electron beam do not overlap each other at least at a start of preheating, and controlling the electron beam to gradually increase at least one of a beam current and the beam size of the electron beam from the start of preheating to an end of preheating.

According to the present invention, the risk of occurrence of smoke can be reduced, and the temperature distribution of the powder layer can be made uniform.

DESCRIPTION OF THE INVENTION

Figure 1:
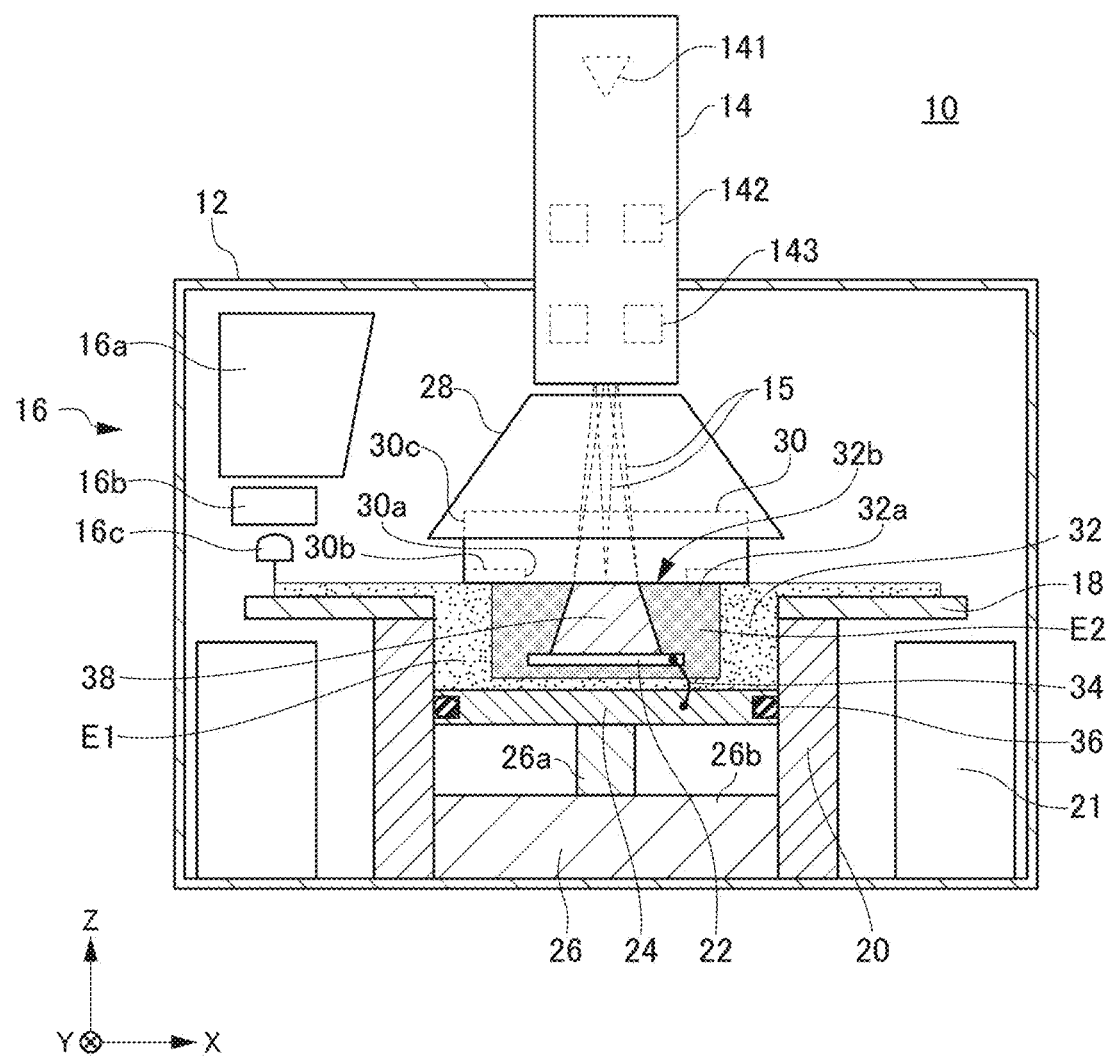
FIG. 1 is a side view schematically illustrating a configuration of a three-dimensional PBF-AM apparatus according to a first embodiment of the present invention.

Embodiments of the present invention will be hereinafter described in detail with reference to the drawings. In the present specification and the drawings, elements having substantially the same function or configuration are denoted by the same reference numerals, and redundant description is omitted.

First Embodiment

FIG. 1 is a side view schematically illustrating a configuration of a three-dimensional PBF-AM apparatus according to a first embodiment of the present invention. In the following description, in order to clarify the shape, positional relationship, and the like of each part of the three-dimensional PBF-AM apparatus, the horizontal direction in FIG. 1 is referred to as an X direction, the depth direction in FIG. 1 is referred to as a Y direction, and the vertical direction in FIG. 1 is referred to as a Z direction. The X direction, the Y direction, and the Z direction are directions orthogonal to one another. The X direction and the Y direction are parallel to the horizontal direction, and the Z direction is parallel to the vertical direction.

As illustrated in FIG. 1, a three-dimensional PBF-AM apparatus 10 includes a vacuum chamber 12, a beam irradiation apparatus 14, a powder application apparatus 16, a build table 18, a build box 20, a recovery box 21, a build plate 22, an inner base 24, and a plate moving apparatus 26.

The vacuum chamber 12 is a chamber for creating a vacuum state by evacuating air from the chamber by a vacuum pump (not illustrated).

The beam irradiation apparatus 14 is an apparatus that emits an electron beam 15 which is one of charged particle beams. The beam irradiation apparatus 14 includes an electron gun 141 that is a generation source of the electron beam 15, a focusing lens 142 that focuses the electron beam 15 generated by the electron gun 141, and a deflection lens 143 that deflects the electron beam 15 focused by the focusing lens 142.

The focusing lens 142 is configured using a focusing coil, and focuses the electron beam 15 by a magnetic field generated by the focusing coil. In addition, the deflection lens 143 is configured using a deflection coil, and deflects the electron beam 15 by a magnetic field generated by the deflection coil.

The powder application apparatus 16 is an apparatus that applies metal powder 32, which is a raw material of a build object 38, onto the build plate 22 to form a powder layer 32a. The powder application apparatus 16 includes a hopper 16a, a powder dropping device 16b, and a squeegee 16c. The hopper 16a is a chamber for storing metal powder. The powder dropping device 16b is a device that drops the metal powder stored in the hopper 16a onto the build table 18. The squeegee 16c moves in the horizontal direction on the build plate 22 to spread the metal powder 32. The squeegee 16c is an elongated member elongated in the Y direction. The squeegee 16c is provided to be movable in the X direction in order to spread the metal powder 32 over the entire surface of the build table 18.

The build table 18 is horizontally arranged inside the vacuum chamber 12. The build table 18 is arranged below the powder application apparatus 16. A central portion of the build table 18 is opened. The opening shape of the build table 18 is a circular shape in plan view or a square shape in plan view (for example, a quadrangle in plan view).

The build box 20 is a box that forms a space for building. An upper end portion of the build box 20 is connected to an opening edge of the build table 18. A lower end portion of the build box 20 is connected to a bottom wall of the vacuum chamber 12.

The recovery box 21 is a box that recovers the metal powder 32 supplied more than necessary from the metal powder 32 supplied onto the build table 18 by the powder application apparatus 16. One recovery box 21 is provided on each of one side and the other side in the X direction.

The build plate 22 is a plate for forming the build object 38 using the metal powder 32. The build object 38 is layered and formed on the build plate 22. The build plate 22 is formed in a circular shape in plan view or a square shape in plan view in accordance with the opening shape of the build table 18. The build plate 22 is connected (grounded) to the inner base 24 via a ground wire 34 so as not to be in an electrically floating state. The inner base 24 is held at a ground (GND) potential. The metal powder 32 is spread over the build plate 22 and the inner base 24.

The inner base 24 is provided to be movable in the vertical direction (Z direction). The build plate 22 moves in the vertical direction integrally with the inner base 24. The inner base 24 has a larger outer dimension than that of the build plate 22. The inner base 24 slides in the vertical direction along an inner surface of the build box 20. A seal member 36 is attached to an outer peripheral portion of the inner base 24. The seal member 36 is a member that maintains slidability and sealability between the outer peripheral portion of the inner base 24 and the inner surface of the build box 20. The seal member 36 is made of a material having heat resistance and elasticity.

The plate moving apparatus 26 is an apparatus that moves the build plate 22 and the inner base 24 in the vertical direction. The plate moving apparatus 26 includes a shaft 26a and a drive mechanism unit 26b. The shaft 26a is connected to a lower surface of the inner base 24. The drive mechanism unit 26b includes a motor and a power transmission mechanism (not illustrated), and drives the power transmission mechanism using the motor as a drive source to move the build plate 22 and the inner base 24 integrally with the shaft 26a in the vertical direction. The power transmission mechanism includes, for example, a rack and pinion mechanism, a ball screw mechanism, or the like.

A radiation shield cover 28 is arranged between the build plate 22 and the beam irradiation apparatus 14 in the Z direction. The radiation shield cover 28 is made of metal such as stainless steel or the like. The radiation shield cover 28 contains radiation heat generated when the metal powder 32 is irradiated with the electron beam 15 by the beam irradiation apparatus 14.

In addition, the radiation shield cover 28 serves a function of suppressing adhesion (vapor deposition) of an evaporated substance generated when the metal powder 32 is irradiated with the electron beam 15 to an inner wall of the vacuum chamber 12. When the metal powder 32 is irradiated with the electron beam 15, a part of the melted metal becomes an atomized evaporated substance and rises from a build surface 32b. The radiation shield cover 28 is arranged so as to cover a space above the build surface 32b so that the evaporated substance does not diffuse into the vacuum chamber 12.

An electron shield 30 has an opening 30a and a shield portion 30b. In forming the build object 38, the electron shield 30 is arranged to cover an upper surface of the metal powder 32, that is, the build surface 32b. At this time, the opening 30a exposes the metal powder 32 spread on the build plate 22, and the shield portion 30b shields the metal powder 32 located outside the opening 30a. The shape of the opening 30a is set in accordance with the shape of the build plate 22. For example, if the build plate 22 is circular in plan view, the shape in plan view of the opening 30a is set to be circular accordingly, and if the build plate 22 is angular in plan view, the shape in plan view of the opening 30a is set to be angular accordingly. In the present embodiment, as an example, it is assumed that the opening 30a has a quadrangular shape in plan view.

The electron shield 30 is arranged below the radiation shield cover 28. The opening 30a and the shield portion 30b of the electron shield 30 are arranged between the build plate 22 and the radiation shield cover 28 in the Z direction. The electron shield 30 includes an enclosure portion 30c. The enclosure portion 30c is arranged so as to surround the space above the opening 30a. A part (upper portion) of the enclosure portion 30c overlaps the radiation shield cover 28 in the Z direction. The enclosure portion 30c has a function of containing radiant heat generated from the build surface 32b and a function of suppressing diffusion of the evaporated substance generated from the build surface 32b. That is, the enclosure portion 30c has the same function as that of the radiation shield cover 28.

Figure 2:
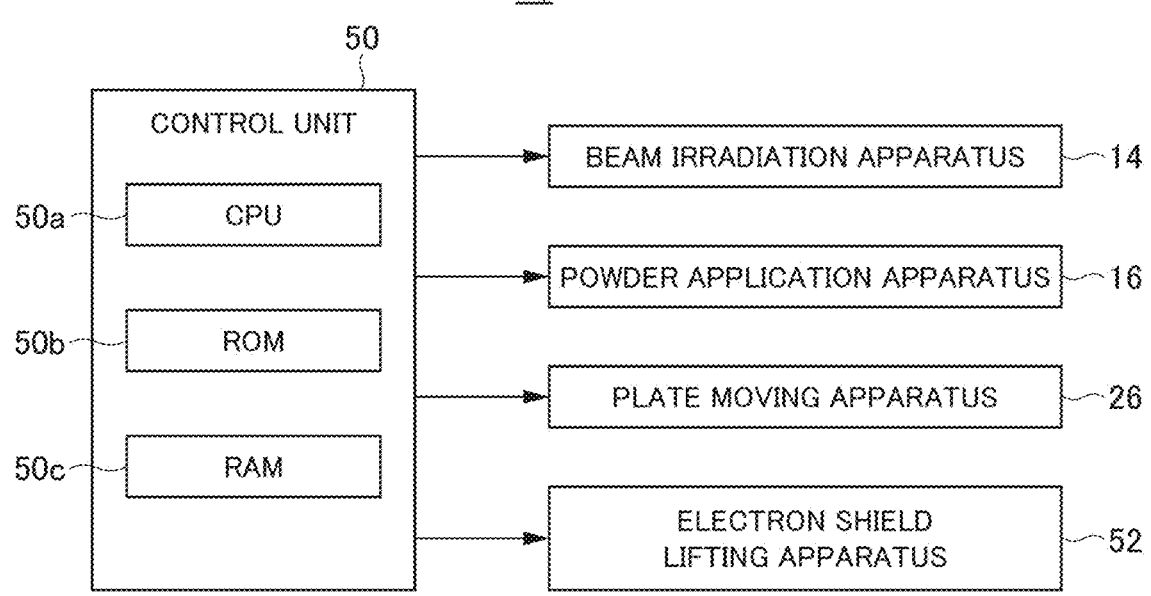
FIG. 2 is a block diagram illustrating a configuration example of a control system of the three-dimensional PBF-AM apparatus according to the first embodiment of the present invention.

FIG. 2 is a block diagram illustrating a configuration example of a control system of the three-dimensional PBF-AM apparatus according to the first embodiment of the present invention.

In FIG. 2, a control unit 50 includes, for example, a central processing unit (CPU) 50a, a read only memory (ROM) 50b, and a random access memory (RAM) 50c, and the CPU 50a reads a program written in the ROM 50b into the RAM 50c and executes predetermined control processing, thereby integrally controlling the operation of the three-dimensional PBF-AM apparatus 10. In addition to the beam irradiation apparatus 14, the powder application apparatus 16, and the plate moving apparatus 26 described above, an electron shield lifting apparatus 52 is connected to the control unit 50.

The beam irradiation apparatus 14 emits the electron beam 15 on the basis of a control command given from the control unit 50. At that time, the control unit 50 controls the electron beam 15 via the electron gun 141, the focusing lens 142, and the deflection lens 143. For example, the control unit 50 controls the beam current of the electron beam 15 via the electron gun 141. In addition, the control unit 50 controls the focus state of the electron beam 15 via the focusing lens 142. In addition, the control unit 50 controls the deflection angle and the deflection speed of the electron beam 15 via the deflection lens 143.

Note that the spot diameter of the electron beam 15 on a horizontal plane (XY plane) changes according to the focus state of the electron beam 15. Therefore, controlling the focus state of the electron beam 15 means controlling the spot diameter of the electron beam 15 with which an object is irradiated. In addition, an irradiation position of the electron beam 15 on the horizontal plane changes according to the deflection angle of the electron beam 15. Therefore, controlling the deflection angle of the electron beam 15 means controlling the irradiation position of the electron beam 15.

The plate moving apparatus 26 moves the build plate 22 on the basis of a control command given from the control unit 50. The powder application apparatus 16 applies the metal powder 32 onto the build plate 22 on the basis of a control command given from the control unit 50. The operations of the hopper 16a, the powder dropping device 16b, and the squeegee 16c included in the powder application apparatus 16 are controlled by the control unit 50. The electron shield lifting apparatus 52 moves up and down the electron shield 30 on the basis of a control command given from the control unit 50.

<Operation of Three-Dimensional PBF-AM Apparatus>

Figure 3:
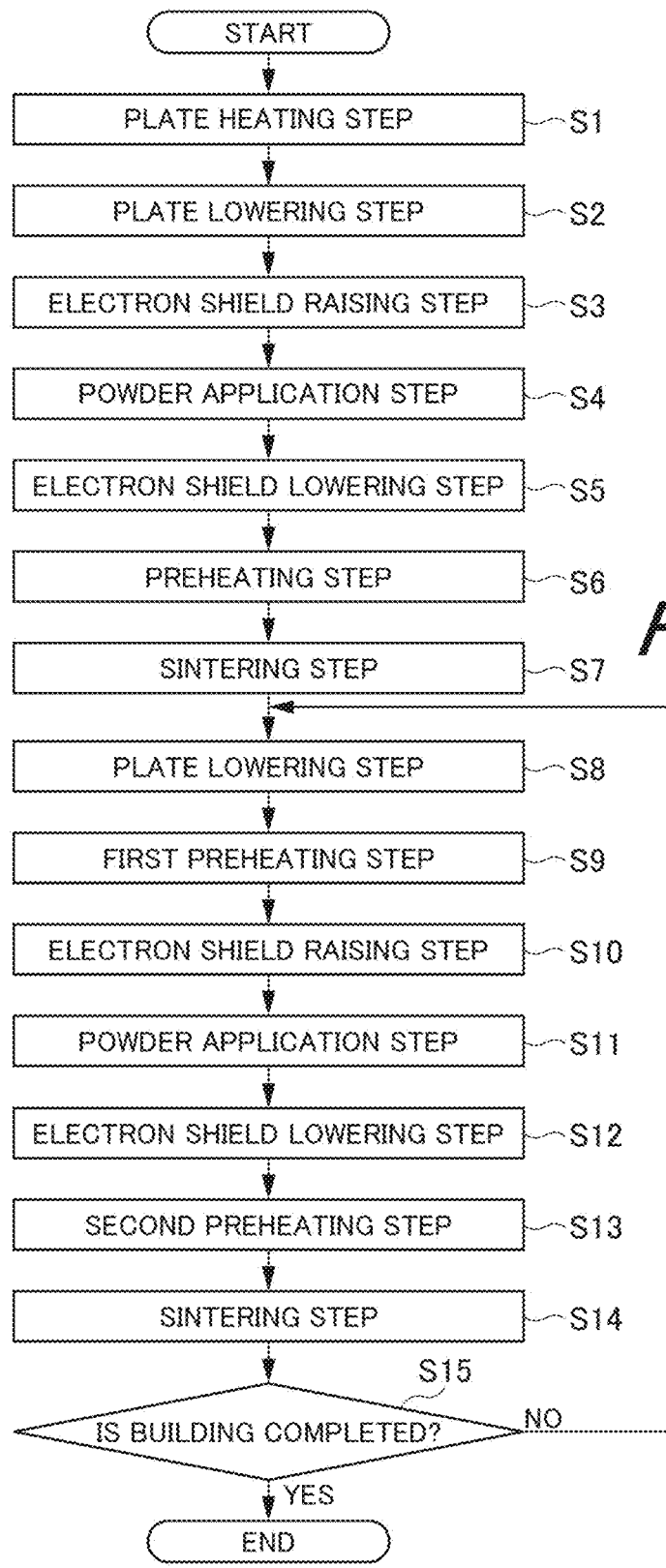
FIG. 3 is a flowchart illustrating a procedure of a processing operation of the three-dimensional PBF-AM apparatus according to the first embodiment of the present invention.

FIG. 3 is a flowchart illustrating a procedure of a processing operation of the three-dimensional PBF-AM apparatus according to the first embodiment of the present invention. The processing operation illustrated in this flowchart is performed under the control of the control unit 50.

First, in a state before starting the building, three sides of the build plate 22 are covered with the metal powder 32 except for an upper surface of the build plate 22. Furthermore, the upper surface of the build plate 22 is arranged at substantially the same height as the upper surface of the metal powder 32 spread on the build table 18. On the other hand, the electron shield 30 is lowered to the upper surface of the build plate 22. In this case, the metal powder 32 present around the build plate 22 is in a state of being covered by the shield portion 30b of the electron shield 30. The shield portion 30b is in a state of contacting the metal powder 32. The building is started under the state described above.

(Plate Heating Step)

First, the beam irradiation apparatus 14 heats the build plate 22 by operating on the basis of a control command given from the control unit 50 (step S1).

In step S1, the beam irradiation apparatus 14 irradiates the build plate 22 with the electron beam 15 through the opening 30a of the electron shield 30. Thus, the build plate 22 is heated to a temperature at which the metal powder 32 is temporarily sintered.

(Plate Lowering Step)

Next, the plate moving apparatus 26 lowers the build plate 22 by a predetermined amount by operating on the basis of a control command given from the control unit 50 (step S2).

In step S2, the plate moving apparatus 26 lowers the inner base 24 by a predetermined amount so that the upper surface of the build plate 22 is slightly lower than the upper surface of the metal powder 32 spread on the build table 18. At this time, the build plate 22 descends by a predetermined amount together with the inner base 24. The predetermined amount (hereinafter also referred to as "AZ") described here corresponds to the thickness of one layer when the build object 38 is built by layering.

(Electron Shield Raising Step)

Next, the electron shield lifting apparatus 52 raises the electron shield 30 by operating on the basis of a control command given from the control unit 50 (step S3).

In step S3, the electron shield lifting apparatus 52 raises the electron shield 30 to a position higher than the squeegee 16c so that the squeegee 16c does not come into contact with the electron shield 30 in the next step S4.

(Powder Application Step)

Next, the powder application apparatus 16 applies the metal powder 32 onto the build plate 22 to form the powder layer 32a by operating on the basis of a control command given from the control unit 50 (step S4).

In step S4, the powder application apparatus 16 drops the metal powder 32 supplied from the hopper 16a to the powder dropping device 16b onto the build table 18 by the powder dropping device 16b, and then moves the squeegee 16c in the X direction to spread the metal powder 32 on the build plate 22. At this time, the metal powder 32 is spread on the build plate 22 with a thickness corresponding to AZ. Thus, the powder layer 32a is formed on the build plate 22. The excess metal powder 32 is recovered in the recovery box 21.

(Electron Shield Lowering Step)

Next, the electron shield lifting apparatus 52 lowers the electron shield 30 by operating on the basis of a control command given from the control unit 50 (step S5).

In step S5, the electron shield lifting apparatus 52 lowers the electron shield 30 so as to come into contact with the build surface 32b of the metal powder 32. Thus, the metal powder 32 on the build plate 22 is exposed to the outside through the opening 30a of the electron shield 30. In addition, the metal powder 32 present around the build plate 22 is in the state of being covered by the shield portion 30b of the electron shield 30.

(Preheating Step)

Next, the beam irradiation apparatus 14 preheats the powder layer 32a on the build plate 22 by operating on the basis of a control command given from the control unit 50 (step S6). In the preheating step S6, the powder layer 32a is preheated in order to temporarily sinter the metal powder 32. The preheating performed before a sintering step is also called powder-heat.

In step S6, the beam irradiation apparatus 14 irradiates the metal powder 32 (powder layer 32a) on the build plate 22 with the electron beam 15. Furthermore, the beam irradiation apparatus 14 irradiates a region wider than a region for forming the build object 38 (hereinafter also referred to as a "build region") with the electron beam 15. Thus, the metal powder 32 present in the build region and the metal powder 32 present around the build region are both temporarily sintered.

In FIG. 1, reference numeral E1 denotes an unsintered region where the unsintered metal powder 32 is present, and reference numeral E2 denotes a temporarily sintered region where the temporarily sintered metal powder 32 is present.

(Sintering Step)

Next, the beam irradiation apparatus 14 sinters the metal powder 32 by melting and solidifying, by operating on the basis of a control command given from the control unit 50 (step S7).

In step S7, the metal powder 32 as a temporarily sintered body is sintered by melting and solidifying the metal powder 32 temporarily sintered as described above by irradiation with the electron beam 15. In step S7, the control unit 50 specifies a build region on the basis of two-dimensional data obtained by slicing three-dimensional computer-aided design (CAD) data of the target build object 38 to a certain thickness (thickness corresponding to AZ), and the beam irradiation apparatus 14 selectively melts the metal powder 32 on the build plate 22 by irradiating the build region specified by the control unit 50 with the electron beam 15. The metal powder 32 melted by the irradiation with the electron beam 15 is solidified after the electron beam 15 passes. Thus, a first layer of the build object is formed.

(Plate Lowering Step)

Next, the plate moving apparatus 26 lowers the build plate 22 by a predetermined amount (AZ) by operating on the basis of a control command given from the control unit 50 (step S8).

In step S8, the plate moving apparatus 26 lowers the build plate 22 and the inner base 24 by AZ.

(First Preheating Step)

Subsequently, the beam irradiation apparatus 14 preheats the powder layer 32a on the build plate 22 by operating on the basis of a control command given from the control unit 50 (step S9). In the first preheating step S9, as a preparation for spreading the metal powder 32 in the next layer, the powder layer 32a that has been subjected to the sintering step in the previous layer is preheated. The preheating performed after the sintering step is also called after-heat.

In step S9, the beam irradiation apparatus 14 irradiates the powder layer 32a with the electron beam 15 through the opening 30a of the electron shield 30. Thus, the powder layer 32a exposed to the opening 30a is heated to a temperature at which the metal powder 32 is temporarily sintered.

(Electron Shield Raising Step)

Next, the electron shield lifting apparatus 52 raises the electron shield 30 by operating on the basis of a control command given from the control unit 50 (step S10).

In step S10, the electron shield lifting apparatus 52 raises the electron shield 30 to a position higher than the squeegee 16c so that the squeegee 16c does not come into contact with the electron shield 30 in the next step S11.

(Powder Application Step)

Next, the powder application apparatus 16 applies the metal powder 32 onto the build plate 22 to form the powder layer 32a by operating on the basis of a control command given from the control unit 50 (step S11).

In step S11, the powder application apparatus 16 operates similarly as in step S4 described above. Thus, on the build plate 22, a second layer of the metal powder 32 is spread over the sintered body formed by a first layer of the metal powder 32.

(Electron Shield Lowering Step)

Next, the electron shield lifting apparatus 52 lowers the electron shield 30 by operating on the basis of a control command given from the control unit 50 (step S12).

In step S12, the electron shield lifting apparatus 52 operates similarly as in step S5 described above.

(Second Preheating Step)

Next, the beam irradiation apparatus 14 preheats the metal powder 32 forming a second layer of the powder layer 32a by operating on the basis of a control command given from the control unit 50 (step S13).

In step S13, the beam irradiation apparatus 14 operates similarly as in step S6 described above. Thus, the metal powder 32 forming the second layer of the powder layer 32a is temporarily sintered.

(Sintering Step)

Next, the beam irradiation apparatus 14 sinters the metal powder 32 forming the second layer of the powder layer 32a by melting and solidifying, by operating on the basis of a control command given from the control unit 50 (step S14).

In step S14, the beam irradiation apparatus 14 operates similarly as in step S7 described above. Thus, a second layer of the build object is formed.

Next, the control unit 50 confirms whether or not the building of the target build object 38 is completed (step S15). When the control unit 50 determines that the building of the build object 38 is not completed, the process returns to Step S8 described above. In this way, the control unit 50 repeats the processes of steps S8 to S14 for each of the third and subsequent layers. When it is determined that the building of the build object 38 is completed, the series of processing is ended at that time.

By the three-dimensional PBF-AM process described above, the target build object 38 is obtained.

In steps S6 and S13 in the three-dimensional PBF-AM process described above, the powder layer 32a is preheated by irradiation with the electron beam 15 in order to temporarily sinter the metal powder 32. At that time, the control unit 50 sets a beam diameter and irradiation positions of the electron beam 15 such that spots of the electron beam 15 do not overlap at least at a start of preheating. In addition, the control unit 50 controls the beam irradiation apparatus 14 to gradually increase the beam diameter of the electron beam 15 from the start of preheating to an end of preheating.

A method of preheating a powder layer according to the first embodiment of the present invention will be hereinafter described with reference to the drawings.

When the powder layer 32a for one layer is preheated by irradiation with the electron beam 15, the control unit 50 preheats the powder layer 32a in a plurality of stages having different irradiation conditions with the electron beam 15. The number of stages for preheating the powder layer 32a can be optionally set, and other embodiments described later can also be optionally set as such. In the present embodiment, as an example, the powder layer 32a is preheated in four stages.

Figure 4:
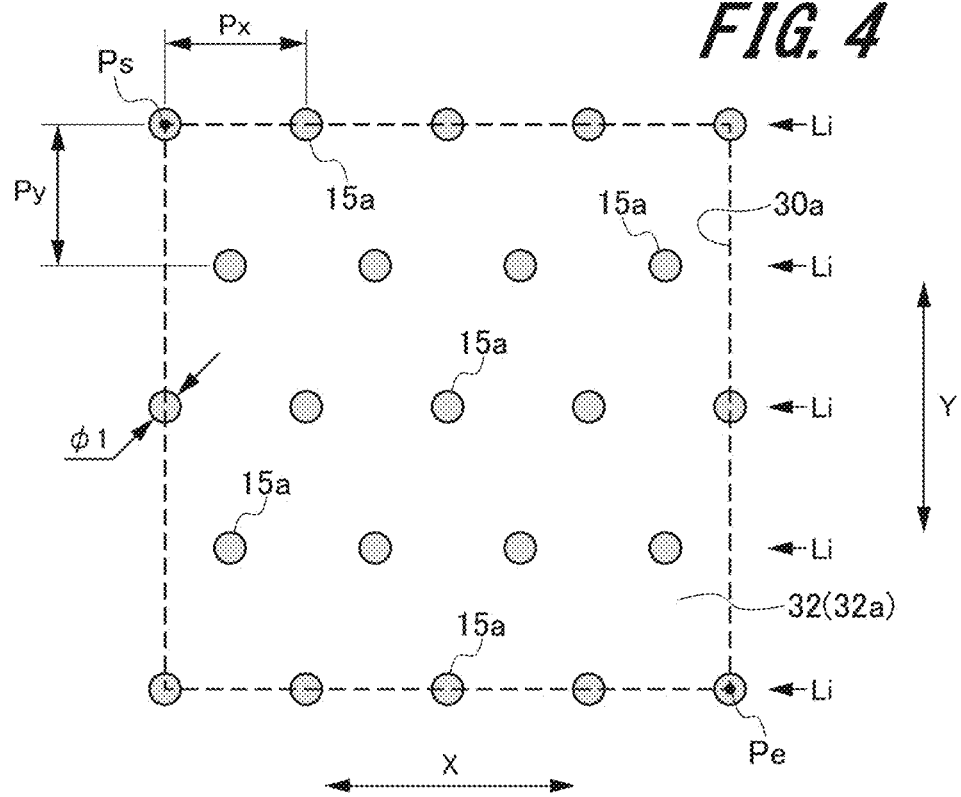
FIG. 4 is a plan view schematically illustrating irradiation positions of an electron beam in a first stage according to the first embodiment of the present invention.

FIG. 4 is a plan view schematically illustrating irradiation positions of an electron beam in a first stage according to the first embodiment of the present invention. A start of the first stage corresponds to the start of preheating.

In FIG. 4, the powder layer 32a of the metal powder 32 exposed to the outside through the opening 30a of the electron shield 30 is irradiated with the electron beam 15. When the powder layer 32a is irradiated with the electron beam 15, a spot (hereinafter also referred to as a "beam spot") 15a of the electron beam 15 is formed at an irradiation position of the electron beam 15. Therefore, the position of the beam spot 15a indicates the irradiation position of the electron beam 15. The control unit 50 moves the irradiation position of the electron beam 15 according to a predetermined preheating pattern. The preheating pattern is a dotted (stepping stone) pattern illustrated in FIG. 4.

Specifically, the control unit 50 divides irradiation positions of the electron beam 15 into a plurality of lines L1 in the Y direction (second direction), and moves the irradiation position of the electron beam 15 from one end to the other end in the X direction (first direction) for each line L1. In addition, the control unit 50 intermittently moves the irradiation position of the electron beam 15 in the X direction by repeating movement and stop of the electron beam 15 in each line L1. At this time, a position where the electron beam 15 stops is an irradiation position of the electron beam 15, that is, a position where the beam spot 15a is formed. In the first stage illustrated in FIG. 4, the control unit 50 sets the beam diameter and the irradiation positions of the electron beam 15 such that the lines L1 of the electron beam 15 do not overlap each other. More specifically, an interval Px between the beam spots 15a in the X direction and an interval Py between the beam spots 15a in the Y direction are both set to be equal to or larger than the beam diameter ($\varphi 1$ illustrated in FIG. 4) of the electron beam 15 so that the beam spots 15a do not overlap each other in the X direction or the Y direction. As a result, the interval Py necessary for avoiding overlapping of the lines L1 is secured between the two lines L1 adjacent to each other in the Y direction. Each line L1 of the electron beam 15 is a line formed by moving the irradiation position of the electron beam 15 in the X direction, and a width of one line L1 has the same dimension as the beam diameter of the electron beam 15. The beam diameter of the electron beam 15 corresponds to the beam size of the electron beam 15, and means the diameter of the spot of the electron beam 15 with which the powder layer 32a is irradiated.

The control unit 50 controls the beam irradiation apparatus 14 to move the irradiation position of the electron beam 15 from a start point Ps to an end point Pe according to the preheating pattern illustrated in FIG. 4 and to repeat this moving operation a predetermined number of times. As a result, in a case where a prescribed value of the number of repetitions of the moving operation is set to, for example, K times (K is an integer of 2 or larger), the first stage ends when the number of repetitions of the moving operation reaches K times. Therefore, in the first stage, each irradiation position of the electron beam 15 is irradiated K times with the electron beam 15 with a size of the beam diameter $\varphi 1$. In the present embodiment, an irradiation region of the electron beam 15 is a quadrangular region, but the present invention is not limited thereto, and the irradiation region of the electron beam 15 may be a circular region. In the embodiment described later, the region may be a circular region as described above.

Figure 5:
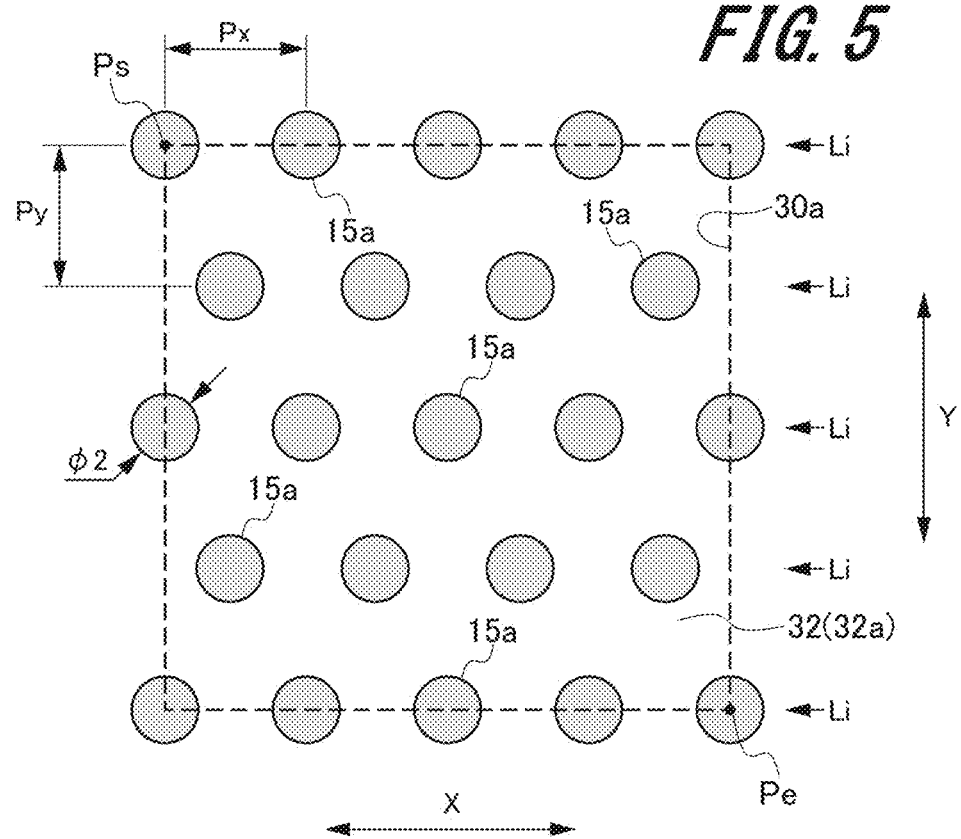
FIG. 5 is a view schematically illustrating irradiation positions of an electron beam in a second stage according to the first embodiment of the present invention.

FIG. 5 is a view schematically illustrating irradiation positions of an electron beam in a second stage according to the first embodiment of the present invention. The second stage is a stage subsequent to the first stage.

In the second stage, the control unit 50 sets the beam diameter of the electron beam 15 to $\varphi 2$ larger than $\varphi 1$ described above in comparison with the first stage. Then, under the setting of the beam diameter=$\varphi 2$, the control unit 50 controls the beam irradiation apparatus 14 to move the irradiation position of the electron beam 15 from the start point Ps to the end point Pe according to a preheating pattern illustrated in FIG. 5 and to repeat this moving operation a predetermined number of times. The number of repetitions of the moving operation may be the same as or different from that in the first stage. In the second stage illustrated in FIG. 5, the control unit 50 sets the beam diameter and the irradiation positions of the electron beam 15 such that the lines L1 of the electron beam 15 do not overlap each other. More specifically, the interval Px between the beam spots 15a in the X direction and the interval Py between the beam spots 15a in the Y direction are both set to be equal to or larger than the beam diameter $\varphi 2$ of the electron beam 15 so that the beam spots 15a do not overlap each other in the X direction or the Y direction. Furthermore, the intervals Px and Py between the beam spots 15a are set to be the same as those in the case of the first stage.

Figure 6:
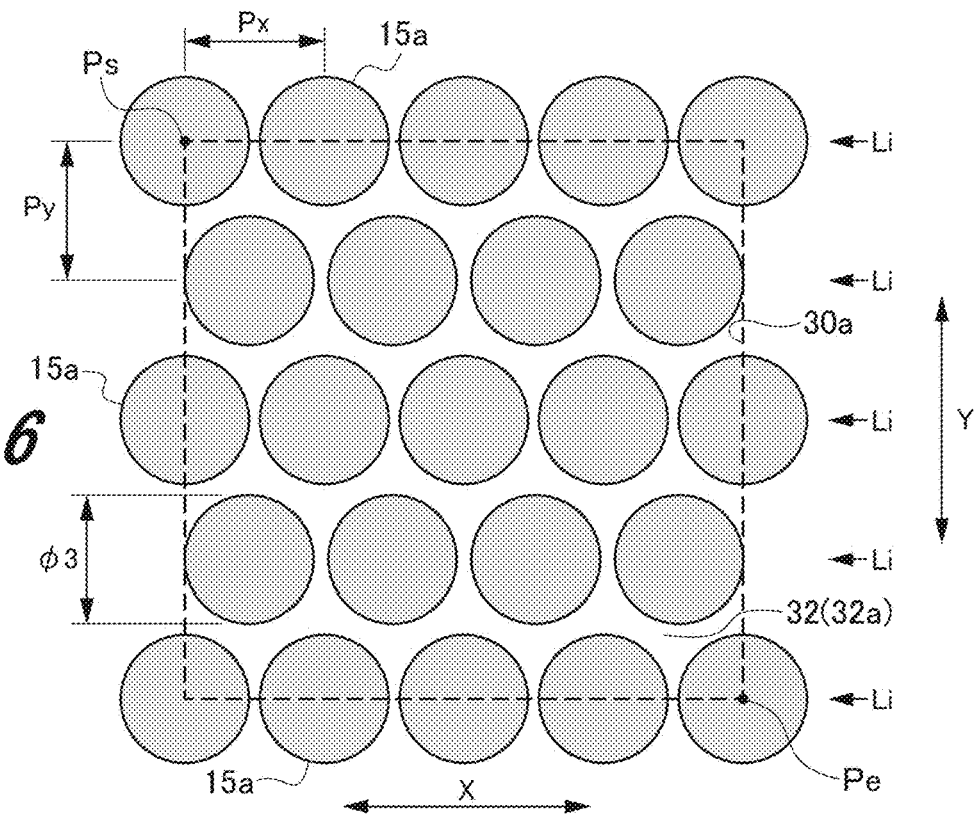
FIG. 6 is a view schematically illustrating irradiation positions of an electron beam in a third stage according to the first embodiment of the present invention.

FIG. 6 is a view schematically illustrating irradiation positions of an electron beam in a third stage according to the first embodiment of the present invention. The third stage is a stage subsequent to the second stage.

In the third stage, the control unit 50 sets the beam diameter of the electron beam 15 to φ3 larger than φ2 described above in comparison with the second stage. Then, under the setting of the beam diameter=φ3, the control unit 50 controls the beam irradiation apparatus 14 to move the irradiation position of the electron beam 15 from the start point Ps to the end point Pe according to a preheating pattern illustrated in FIG. 6 and to repeat this moving operation a predetermined number of times. The number of repetitions of the moving operation may be the same as or different from that in the first stage. In the third stage illustrated in FIG. 6, the control unit 50 sets the beam diameter and the irradiation positions of the electron beam 15 such that the lines L1 of the electron beam 15 do not overlap each other. More specifically, the interval Px between the beam spots 15a in the X direction and the interval Py between the beam spots 15a in the Y direction are both set to be equal to or larger than the beam diameter φ3 of the electron beam 15 so that the beam spots 15a do not overlap each other in the X direction or the Y direction. Furthermore, the intervals Px and Py between the beam spots 15a are set to be the same as those in the case of the first stage.

Figure 7:
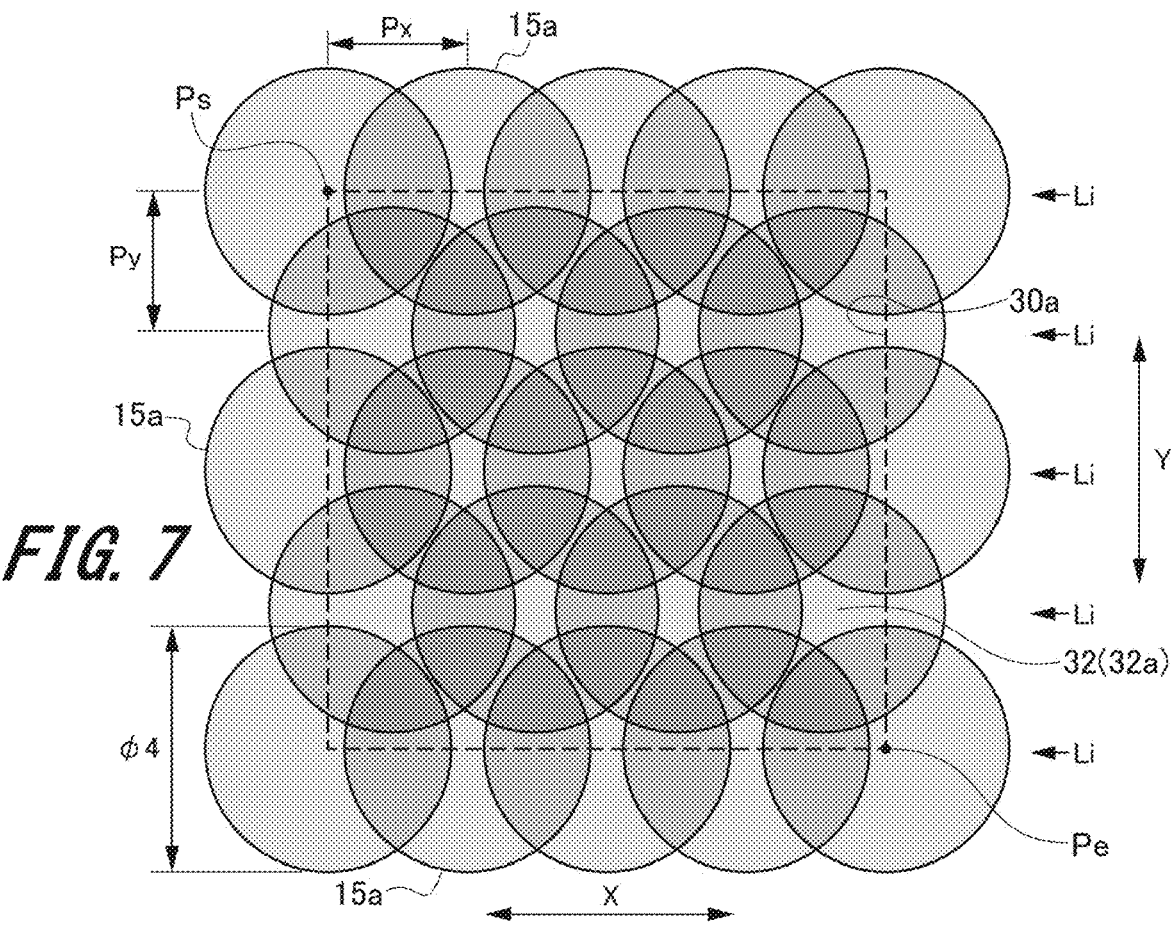
FIG. 7 is a view schematically illustrating irradiation positions of an electron beam in a fourth stage according to the first embodiment of the present invention.

FIG. 7 is a view schematically illustrating irradiation positions of an electron beam in a fourth stage according to the first embodiment of the present invention. The fourth stage is a stage subsequent to the third stage. The end of the fourth stage corresponds to the end of preheating.

In the fourth stage, the control unit 50 sets the beam diameter of the electron beam 15 to φ4 larger than φ3 described above in comparison with the third stage. Then, under the setting of the beam diameter=φ4, the control unit 50 controls the beam irradiation apparatus 14 to move the irradiation position of the electron beam 15 from the start point Ps to the end point Pe according to a preheating pattern illustrated in FIG. 7 and to repeat this moving operation a predetermined number of times. The number of repetitions of the moving operation may be the same as or different from that in the first stage. In the fourth stage illustrated in FIG. 7, the control unit 50 sets the beam diameter and the irradiation positions of the electron beam 15 such that the lines L1 of the electron beam 15 overlap each other. More specifically, the interval Px between the beam spots 15a in the X direction and the interval Py between the beam spots 15a in the Y direction are both set to be smaller than the beam diameter φ4 of the electron beam 15 so that the beam spots 15a overlap each other in the X direction and the Y direction. As a result, the two lines L1 adjacent to each other in the Y direction partially overlap each other. Furthermore, the intervals Px and Py between the beam spots 15a are set to be the same as those in the case of the first stage. That is, the intervals Px and Py between the beam spots 15a are constant from the start of preheating to the end of preheating.

When the beam diameter is gradually increased, the area of the beam spots 15a spreading out of the opening 30a is increased. However, since the outside of the opening 30a is covered with the shield portion 30b (see FIG. 1), even if the beam spots 15a spread out of the opening 30a, smoke does not occur.

As described above, in the first embodiment of the present invention, the control unit 50 sets the beam diameter and the irradiation positions of the electron beam 15 such that the lines L1 of the electron beam 15 do not overlap each other in the first stage including the start of preheating and the subsequent second and third stages. This makes it possible to increase the temperature of the powder layer 32a while suppressing the occurrence of smoke. In addition, the control unit 50 controls the beam irradiation apparatus 14 to gradually increase the beam diameter of the electron beam 15 from the start of preheating in the first stage to the end of preheating in the fourth stage. As a result, the preheating in the fourth stage can be performed in a state where the temporary sintering of the powder layer 32a has progressed to some extent by the preheating from the first stage to the third stage. Therefore, even if the electron beam 15 is emitted such that the lines L1 of the electron beam 15 overlap each other in the fourth stage, the occurrence of smoke can be suppressed. In addition, by setting the beam diameter of the electron beam 15 to be large as φ4 in the final fourth stage, the powder layer 32a can be heated to a uniform temperature. As a result, the risk of occurrence of smoke can be reduced, and the temperature distribution of the powder layer 32a can be made uniform.

Second Embodiment

Next, a second embodiment of the present invention will be described.

The second embodiment of the present invention is different from the first embodiment described above in a method of preheating the powder layer 32a under the control of the control unit 50. Specifically, in each of the first stage, the second stage, the third stage, and the fourth stage described above, the control unit 50 controls the beam irradiation apparatus 14 to gradually increase the beam current of the electron beam 15.

Figure 8:
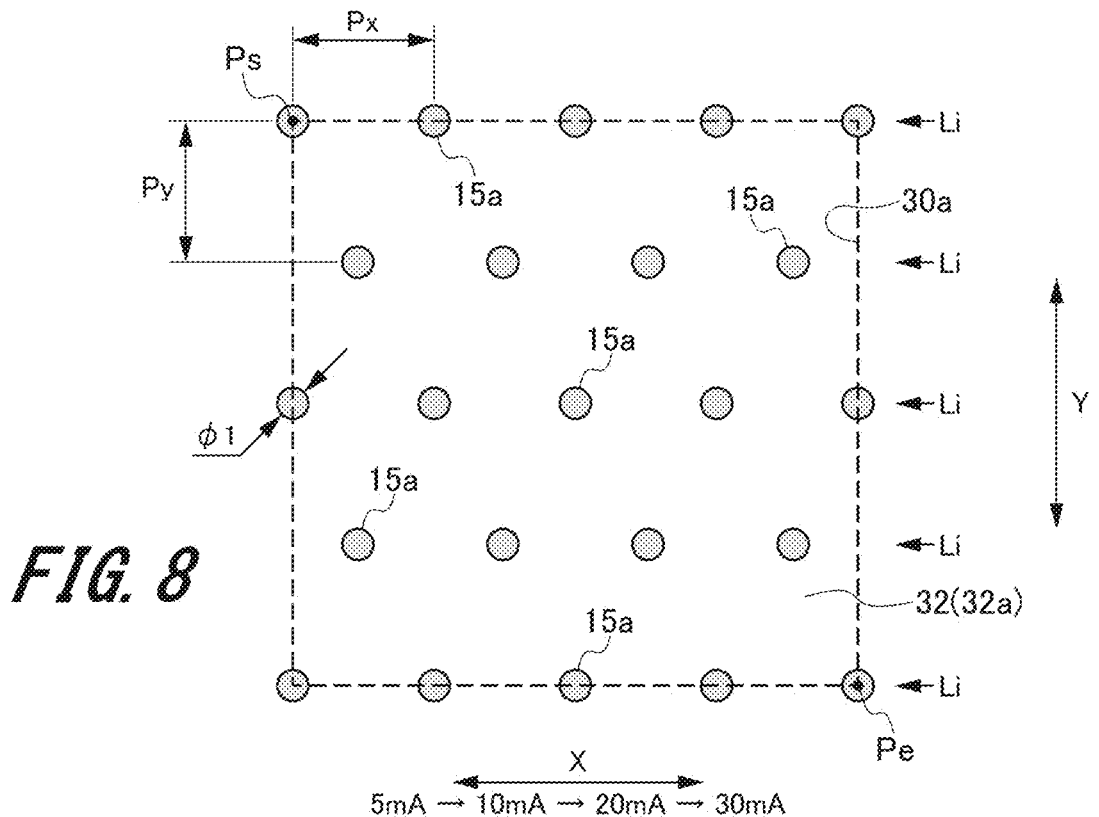
FIG. 8 is a plan view schematically illustrating irradiation positions of an electron beam in a first stage according to a second embodiment of the present invention.

FIG. 8 is a plan view schematically illustrating irradiation positions of an electron beam in a first stage according to the second embodiment of the present invention.

In the first stage illustrated in FIG. 8, the setting of the beam diameter φ1 and the irradiation positions of the electron beam 15 and the setting of the intervals Px and Py between the beam spots 15a are the same as those in the case of the first embodiment (see FIG. 4).

In this first stage, the control unit 50 controls the beam irradiation apparatus 14 to move the irradiation position (beam spot 15a) of the electron beam 15 from the start point Ps to the end point Pe according to a preheating pattern illustrated in FIG. 8 and to repeat this moving operation a predetermined number of times. In addition, in a case where the moving operation in the first stage is repeated, for example, 100 times in total, the control unit 50 sets the beam current of the electron beam 15 to 5 mA in the first to 25th moving operations, sets the beam current to 10 mA in the 26th to 50th moving operations, sets the beam current to 20 mA in the 51st to 75th moving operations, and sets the beam current to 30 mA in the 75th to 100th moving operations. That is, the control unit 50 gradually increases the beam current from the start to the end of the first stage.

Figure 9:
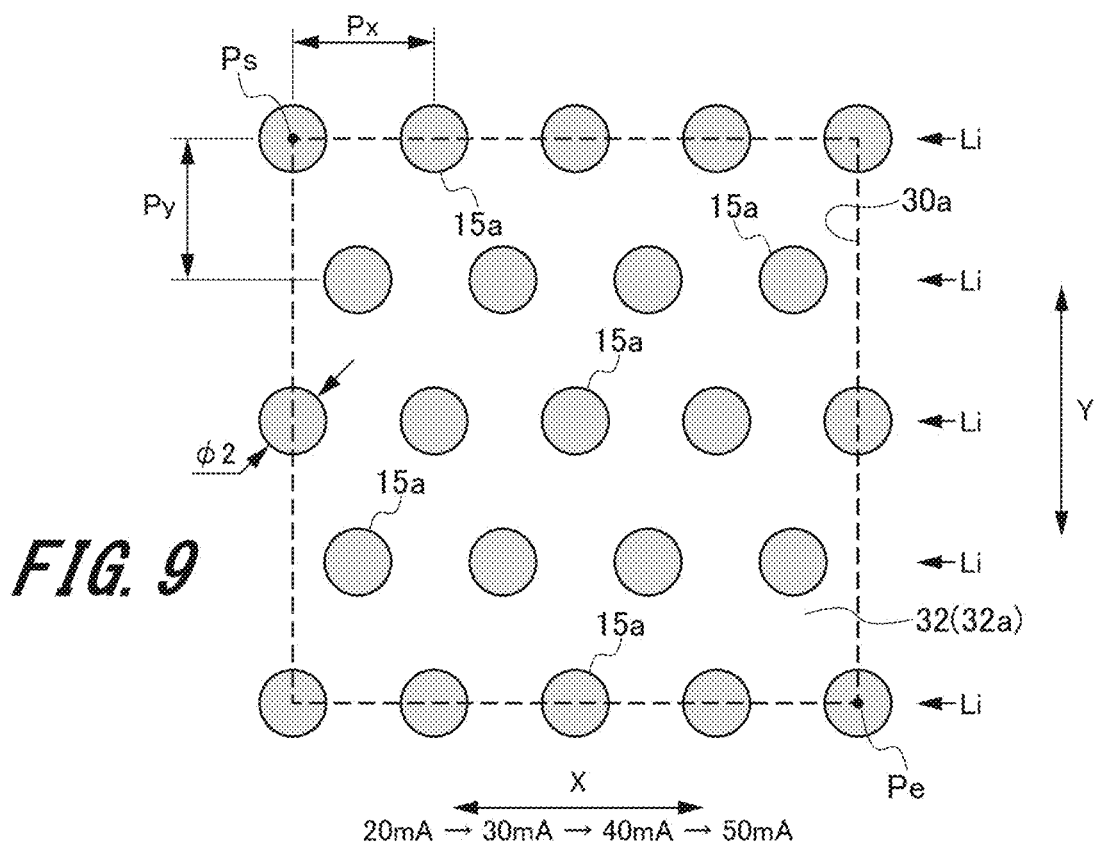
FIG. 9 is a plan view schematically illustrating irradiation positions of an electron beam in a second stage according to the second embodiment of the present invention.

FIG. 9 is a plan view schematically illustrating irradiation positions of an electron beam in a second stage according to the second embodiment of the present invention.

In the second stage illustrated in FIG. 9, the setting of the beam diameter φ2 and the irradiation positions of the electron beam 15 and the setting of the intervals Px and Py between the beam spots 15a are the same as those in the case of the first embodiment (see FIG. 5).

In this second stage, the control unit 50 controls the beam irradiation apparatus 14 to move the irradiation position (beam spot 15a) of the electron beam 15 from the start point Ps to the end point Pe according to a preheating pattern illustrated in FIG. 9 and to repeat this moving operation a predetermined number of times. In addition, in a case where the moving operation in the second stage is repeated, for example, 100 times in total, the control unit 50 sets the beam current of the electron beam 15 to 20 mA in the first to 25th moving operations, sets the beam current to 30 mA in the 26th to 50th moving operations, sets the beam current to 40 mA in the 51st to 75th moving operations, and sets the beam current to 50 mA in the 75th to 100th moving operations. That is, the control unit 50 gradually increases the beam current from the start to the end of the second stage.

Figure 10:
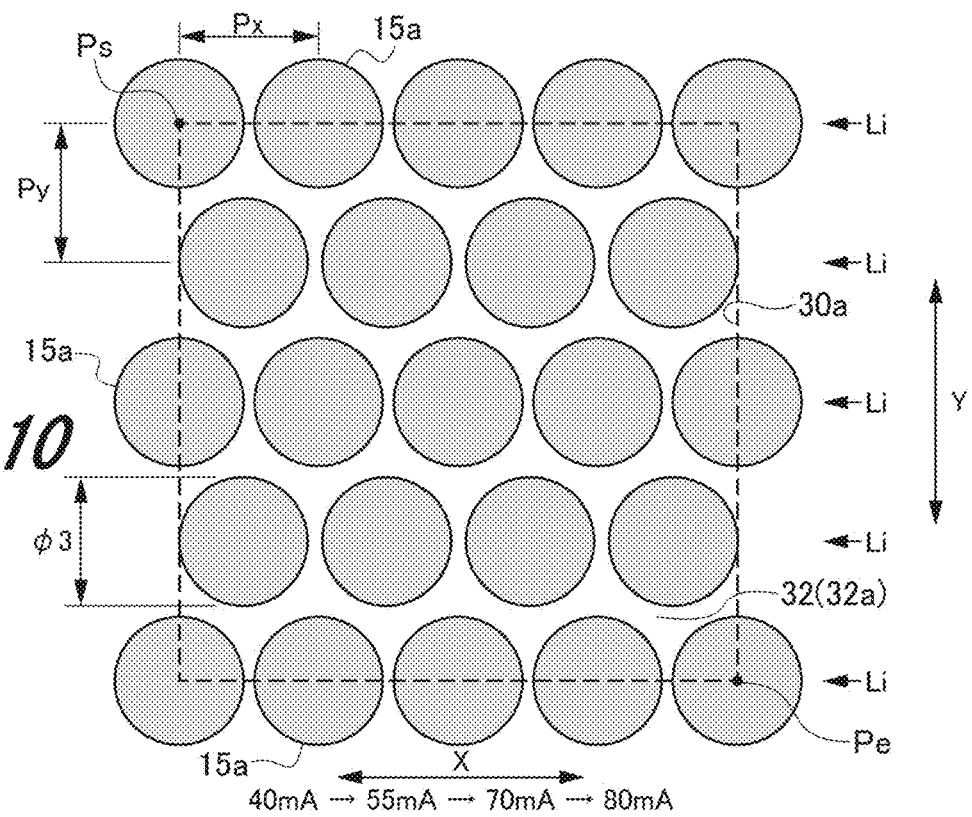
FIG. 10 is a plan view schematically illustrating irradiation positions of an electron beam in a third stage according to the second embodiment of the present invention.

FIG. 10 is a plan view schematically illustrating irradiation positions of an electron beam in a third stage according to the second embodiment of the present invention.

In the third stage illustrated in FIG. 10, the setting of the beam diameter φ3 and the irradiation positions of the electron beam 15 and the setting of the intervals Px and Py between the beam spots 15a are the same as those in the case of the first embodiment (see FIG. 6).

In this third stage, the control unit 50 controls the beam irradiation apparatus 14 to move the irradiation position (beam spot 15a) of the electron beam 15 from the start point Ps to the end point Pe according to a preheating pattern illustrated in FIG. 10 and to repeat this moving operation a predetermined number of times. In addition, in a case where the moving operation in the third stage is repeated, for example, 100 times in total, the control unit 50 sets the beam current of the electron beam 15 to 40 mA in the first to 25th moving operations, sets the beam current to 55 mA in the 26th to 50th moving operations, sets the beam current to 70 mA in the 51st to 75th moving operations, and sets the beam current to 80 mA in the 75th to 100th moving operations. That is, the control unit 50 gradually increases the beam current from the start to the end of the third stage.

Figure 11:
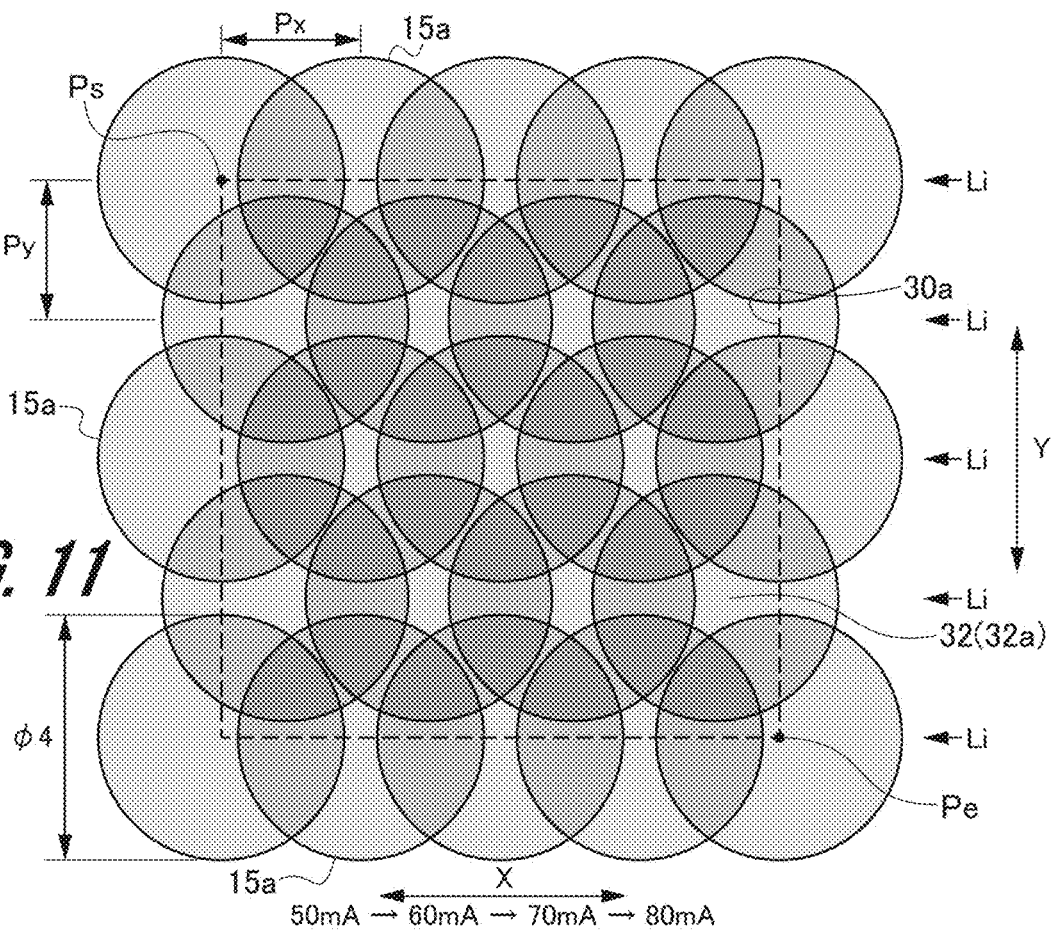
FIG. 11 is a plan view schematically illustrating irradiation positions of an electron beam in a fourth stage according to the second embodiment of the present invention.

FIG. 11 is a plan view schematically illustrating irradiation positions of an electron beam in a fourth stage according to the second embodiment of the present invention.

In the fourth stage illustrated in FIG. 11, the setting of the beam diameter φ4 and the irradiation positions of the electron beam 15 and the setting of the intervals Px and Py between the beam spots 15a are the same as those in the case of the first embodiment (see FIG. 7).

In this fourth stage, the control unit 50 controls the beam irradiation apparatus 14 to move the irradiation position (beam spot 15a) of the electron beam 15 from the start point Ps to the end point Pe according to a preheating pattern illustrated in FIG. 11 and to repeat this moving operation a predetermined number of times. In addition, in a case where the moving operation in the fourth stage is repeated, for example, 100 times in total, the control unit 50 sets the beam current of the electron beam 15 to 50 mA in the first to 25th moving operations, sets the beam current to 60 mA in the 26th to 50th moving operations, sets the beam current to 70 mA in the 51st to 75th moving operations, and sets the beam current to 80 mA in the 75th to 100th moving operations. That is, the control unit 50 gradually increases the beam current from the start to the end of the fourth stage.

In each of the first stage to the fourth stage, the number of repetitions of the moving operation can be optionally changed. In addition, the condition for proceeding to the next stage is not limited to the number of repetitions of the moving operation, and may be determined by time, for example, such that the process proceeds to the second stage after the first stage is performed for a predetermined time. In other embodiments to be described later, it may be determined by time as described above. In addition, the value of the beam current applied to each stage is merely an example, and is not limited to this example.

In the second embodiment of the present invention, in addition to the same effects as those of the first embodiment described above, the following effects can be obtained.

The control unit 50 controls the beam irradiation apparatus 14 to gradually increase not only the beam diameter of the electron beam 15 but also the beam current of the electron beam 15 in each stage from the start of preheating in the first stage to the end of preheating in the fourth stage. As a result, the risk of smoke generation in each stage can be reduced as compared with a case where the beam current of the electron beam 15 is controlled to be constant from the start of preheating to the end of preheating.

In the second embodiment, the beam current of the electron beam 15 is controlled to gradually increase in each stage from the first stage to the fourth stage, but the present invention is not limited thereto. For example, the beam current may be controlled to be constant in each stage, and the beam current may be controlled to increase at the timing when the stage of preheating is switched. In the second embodiment, the beam current of the electron beam 15 is controlled to gradually increase in all stages from the first stage to the fourth stage, but the present invention is not limited thereto, and the beam current of the electron beam 15 may be controlled to gradually increase in at least one of the stages. That is, the method of controlling the beam current of the electron beam 15 to increase can be variously modified.

Third Embodiment

Next, a third embodiment of the present invention will be described.

The third embodiment of the present invention is different from the first embodiment and the second embodiment described above in that the beam current of the electron beam 15 is gradually increased without changing the beam diameter of the electron beam 15. In the first embodiment and the second embodiment described above, the preheating of the powder layer 32a is performed in four stages, but the third embodiment of the present invention is different in that the preheating of the powder layer 32a is performed in two stages.

Figure 12:
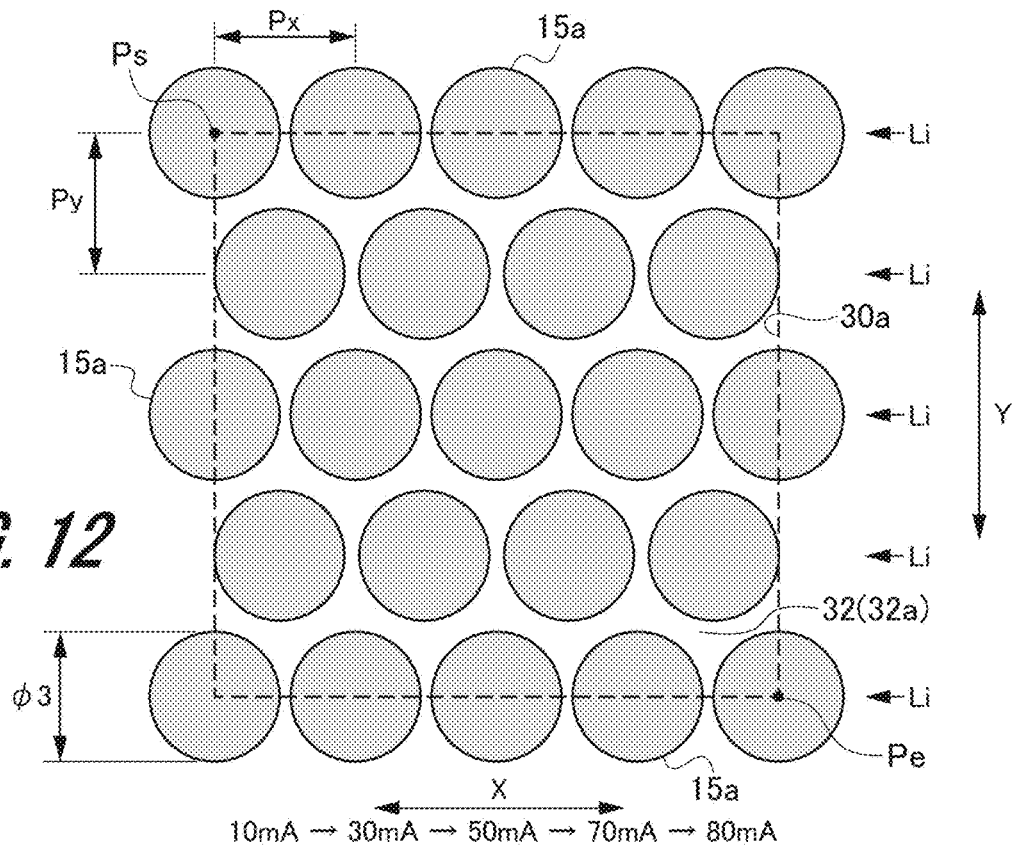
FIG. 12 is a plan view schematically illustrating irradiation positions of an electron beam in a first stage according to a third embodiment of the present invention.

FIG. 12 is a plan view schematically illustrating irradiation positions of an electron beam in a first stage according to the third embodiment of the present invention.

In the first stage illustrated in FIG. 12, the setting of the beam diameter φ3 and the irradiation positions of the electron beam 15 and the setting of the intervals Px and Py between the beam spots 15a are the same as those in the third stage of the first embodiment (see FIG. 6) and the third stage of the second embodiment (see FIG. 10).

In this first stage, while maintaining the beam diameter φ3 of the electron beam 15 constant, the control unit 50 controls the beam irradiation apparatus 14 to move the irradiation position (beam spot 15a) of the electron beam 15 from the start point Ps to the end point Pe according to a preheating pattern illustrated in FIG. 12 and to repeat this moving operation a predetermined number of times. In addition, in a case where the moving operation is repeated, for example, 100 times in total, the control unit 50 sets the beam current of the electron beam 15 to 10 mA in the first to 20th moving operations, sets the beam current to 30 mA in the 21st to 40th moving operations, sets the beam current to 50 mA in the 41st to 60th moving operations, sets the beam current to 70 mA in the 61st to 80th moving operations, and sets the beam current to 80 mA in the 81st to 100th moving operations.

That is, the control unit 50 gradually increases the beam current from the start to the end of the first stage.

Figure 13:
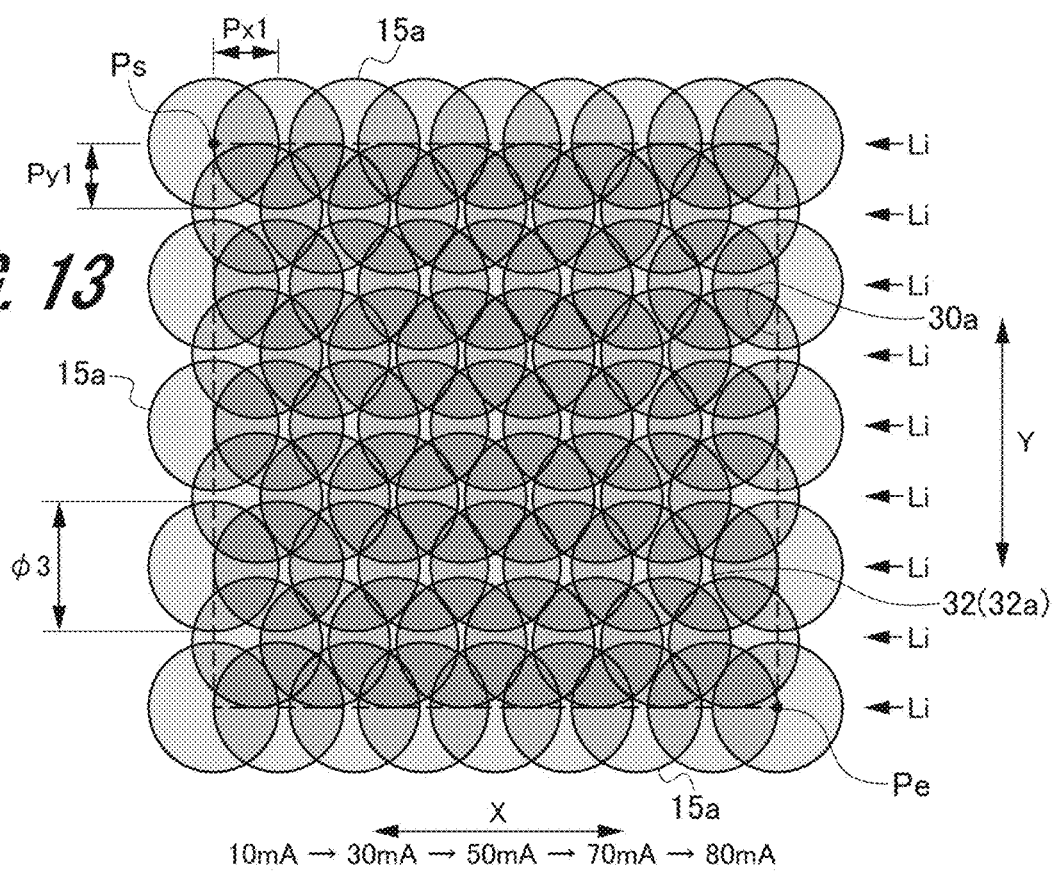
FIG. 13 is a plan view schematically illustrating irradiation positions of an electron beam in a second stage according to the third embodiment of the present invention.

FIG. 13 is a plan view schematically illustrating irradiation positions of an electron beam in a second stage according to the third embodiment of the present invention.

In the second stage illustrated in FIG. 13, the control unit 50 sets the interval between the beam spots 15a to be narrow without changing the beam diameter φ3 of the electron beam 15 as compared with the first stage illustrated in FIG. 12 so that the lines L1 of the electron beam 15 overlap each other. Specifically, the control unit 50 sets intervals Px1 and Py1 between the beam spots 15a to be smaller than the beam diameter φ3 so that the beam spots 15a overlap each other in both the X direction and the Y direction.

In this second stage, while maintaining the beam diameter φ3 of the electron beam 15 constant, the control unit 50 controls the beam irradiation apparatus 14 to move the irradiation position (beam spot 15a) of the electron beam 15 from the start point Ps to the end point Pe according to a preheating pattern illustrated in FIG. 13 and to repeat this moving operation a predetermined number of times. In addition, the control unit 50 gradually increases the beam current from the start to the end of the second stage in the same control mode as that in the first stage.

In the second stage, since the intervals Px1 and Py1 between the beam spots 15a are set narrower than those in the first stage, movement and stop of the electron beam 15 are repeated more times until the irradiation position of the electron beam 15 is moved from the start point Ps to the end point Pe. Therefore, the interval between the two lines L1 adjacent to each other in the Y direction is narrowed, and the number of lines L1 is increased. In addition, the arrangement of the beam spots 15a indicating the irradiation positions of the electron beam 15 is denser than that in the first stage.

As described above, in the third embodiment of the present invention, in the first stage and the second stage, since the beam current of the electron beam 15 is gradually increased without changing the beam diameter of the electron beam 15, the temperature of the powder layer 32a can be increased while suppressing the occurrence of smoke. In addition, in the second stage, since the interval Py1 between the beam spots 15a is set to be narrow so that the lines L1 of the electron beam 15 overlap each other, the powder layer 32a can be heated to a uniform temperature. Furthermore, in the second stage, since the intervals Px1 and Py1 between the beam spots 15a are set to be narrow so that the beam spots 15a overlap each other in both the X direction and the Y direction, the powder layer 32a can be heated to a more uniform temperature.

In the third embodiment, by setting the intervals Px1 and Py1 between the beam spots 15a applied in the second stage narrower than the intervals Px and Py between the beam spots 15a applied in the first stage, in the second stage, the lines L1 of the electron beam 15 overlap each other and the beam spots 15a overlap each other with the same beam diameter φ3 as that in the first stage. Such a method is also applicable to the first embodiment and the second embodiment. For example, in the second embodiment, the beam diameter φ4 of the electron beam 15 is set to be large in order to overlap the lines L1 of the electron beam 15 each other and the beam spots 15a each other in the fourth stage. However, in addition to this, in the fourth stage, as illustrated in FIG. 13, the beam diameter φ3 of the electron beam 15 is set to be the same as that in the third stage, and the intervals Px1 and Py1 between the beam spots 15a are set to be narrower than those in the third stage, so that the lines L1 of the electron beam 15 can overlap each other and the beam spots 15a can overlap each other. The same applies to the first embodiment.

Fourth Embodiment

Next, a fourth embodiment of the present invention will be described.

In the fourth embodiment of the present invention, with respect to a first powder layer 32a and a second powder layer 32a layered at different positions in a layering direction, the control unit 50 sets an irradiation position of the electron beam 15 applied when the first powder layer 32a is preheated and an irradiation position of the electron beam 15 applied when the second powder layer 32a is preheated, to be shifted in a direction orthogonal to the layering direction. The layering direction is a direction in which the powder layers 32a are layered for building the three-dimensional build object 38, that is, the Z direction. The direction orthogonal to the layering direction is a direction parallel to the upper surface of the build plate 22, that is, the horizontal direction.

In the fourth embodiment of the present invention, a case where the first powder layer 32a is an Mth layer (M is a natural number) of the powder layer 32a and the second powder layer 32a is an M+1th layer of the powder layer 32a will be described as an example. However, the first powder layer 32a and the second powder layer 32a do not have to be adjacent to each other in the layering direction, and one or more powder layers 32a may be interposed between the first powder layer 32a and the second powder layer 32a. That is, the irradiation position of the electron beam 15 may be shifted for each layer or for each unit of multiple layers.

When the irradiation position of the electron beam 15 is shifted for each unit of multiple layers, the number of layers of the powder layer 32a interposed between the first powder layer 32a and the second powder layer 32a may be set to the number of layers suitable for dispersing a mass of temporarily sintered bodies. The mass of temporarily sintered bodies is a mass formed of hard temporarily sintered bodies each formed at the irradiation position of the electron beam 15 when the powder layer 32a is preheated by irradiation with the electron beam 15, the temporarily sintered bodies being layered long in the layering direction. When the mass of the temporarily sintered bodies is formed, the processing time to remove the temporarily sintered bodies from the target build object 38 by blasting treatment becomes long.

Figure 14:
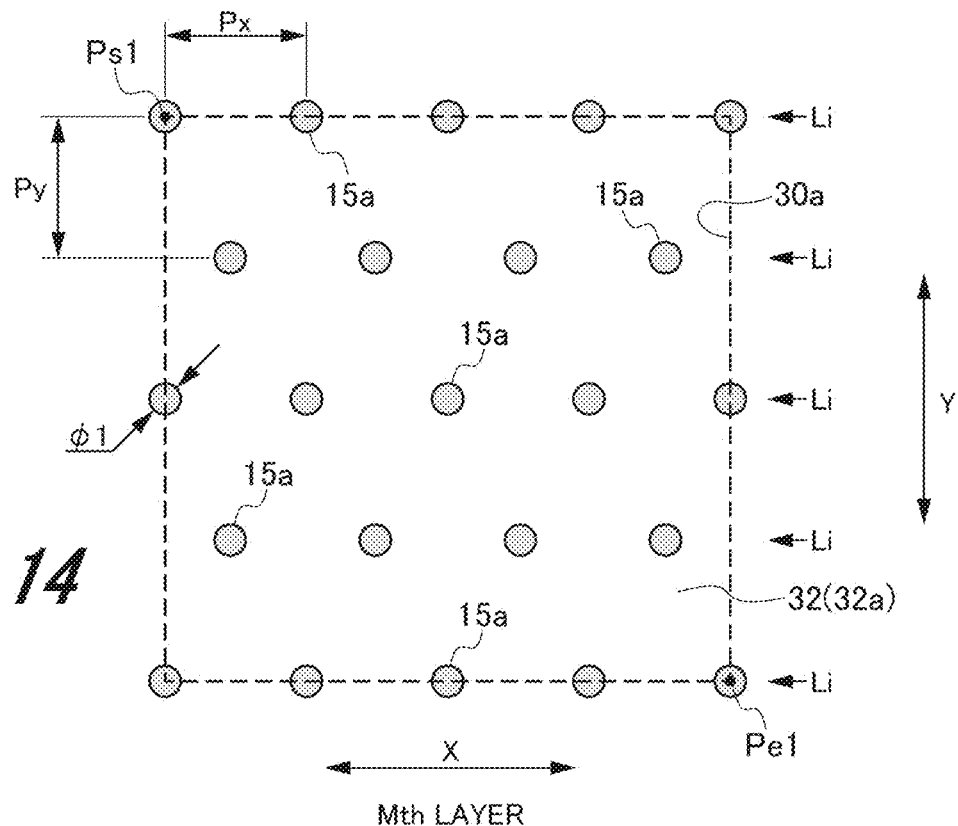
FIG. 14 is a plan view schematically illustrating irradiation positions of an electron beam with respect to an Mth layer of a powder layer according to a fourth embodiment of the present invention.

Therefore, when the Mth layer of the powder layer 32a is preheated, the control unit 50 controls the beam irradiation apparatus 14 to move the irradiation position (beam spot 15a) of the electron beam 15 from a start point Ps1 to an end point Pe1 according to a preheating pattern illustrated in FIG. 14 and to repeat this moving operation. Then, when the M+1th layer of the powder layer 32a is preheated, the control unit 50 controls the beam irradiation apparatus 14 to move the irradiation position (beam spot 15a) of the electron beam 15 from a start point Ps2 to an end point Pe2 according to a preheating pattern illustrated in FIG. 15 and to repeat this moving operation.

Figure 15:
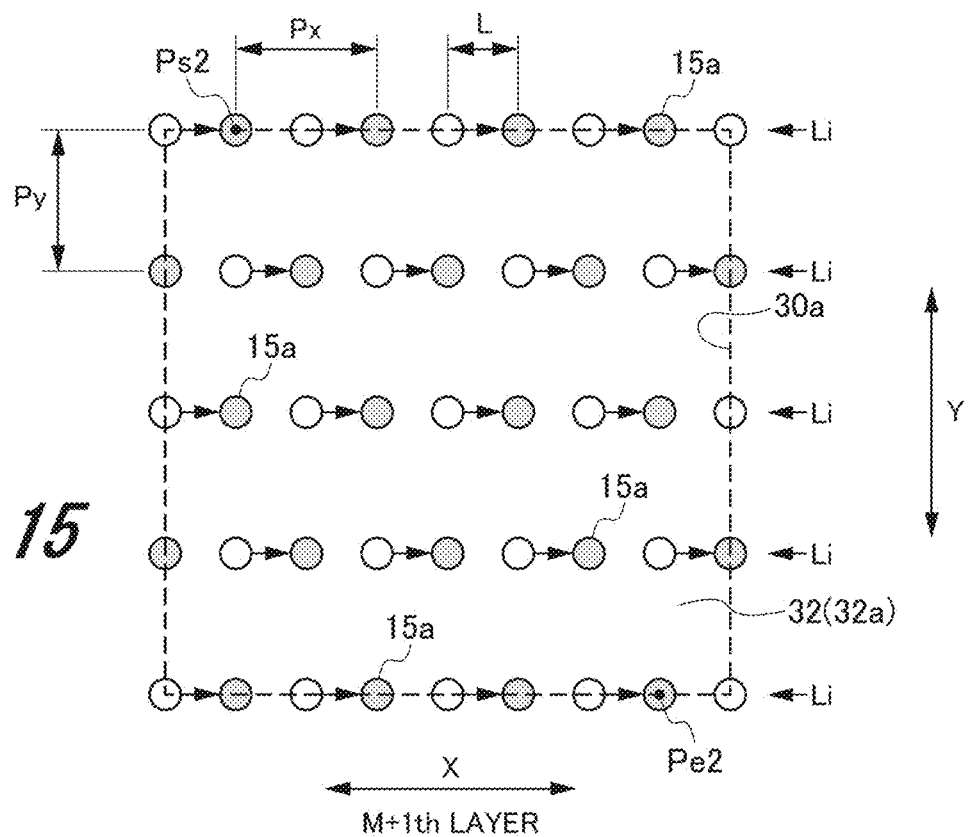
FIG. 15 is a plan view schematically illustrating irradiation positions of an electron beam with respect to an M+1th layer of the powder layer according to the fourth embodiment of the present invention.

As can be seen from a comparison between the preheating pattern illustrated in FIG. 14 and the preheating pattern illustrated in FIG. 15, the beam irradiation positions when the M+1th layer of the powder layer 32a is preheated are shifted by a predetermined distance L in the X direction from the respective beam irradiation positions when the Mth layer of the powder layer 32a is preheated. By shifting the beam irradiation position in this manner, the position of the temporarily sintered body formed at the beam irradiation position of the Mth layer of the powder layer 32a and the position of the temporarily sintered body formed at the beam irradiation position of the M+1th layer of the powder layer 32a are shifted in the horizontal direction, so that these temporarily sintered bodies can be divided in the layering direction. As a result, it is possible to suppress formation of the mass of the temporarily sintered bodies layered long in the layering direction. Therefore, the operation of removing the temporarily sintered bodies from the target build object 38 by blasting treatment can be completed in a short time.

The direction in which the beam irradiation position is shifted is not limited to the X direction.

The fourth embodiment of the present invention is also applicable to the first embodiment, the second embodiment, and the third embodiment described above. However, when the fourth embodiment of the present invention is applied to the third embodiment, if the direction in which the interval between the beam spots 15a is changed is, for example, the X direction, the direction in which the beam irradiation position can be shifted between the first powder layer 32a and the second powder layer 32a is the Y direction alone. This also applies to a case where the interval between the beam spots 15a is changed as illustrated in FIG. 13 in the fourth stage of the first embodiment or the fourth stage of the second embodiment.

Fifth Embodiment

Next, a fifth embodiment of the present invention will be described.

In the fifth embodiment of the present invention, when the powder layer 32a is preheated by irradiation with the electron beam 15, the control unit 50 controls the beam irradiation apparatus 14 to irradiate a wider area than the opening 30a of the electron shield 30 with the electron beam 15.

Figure 16:
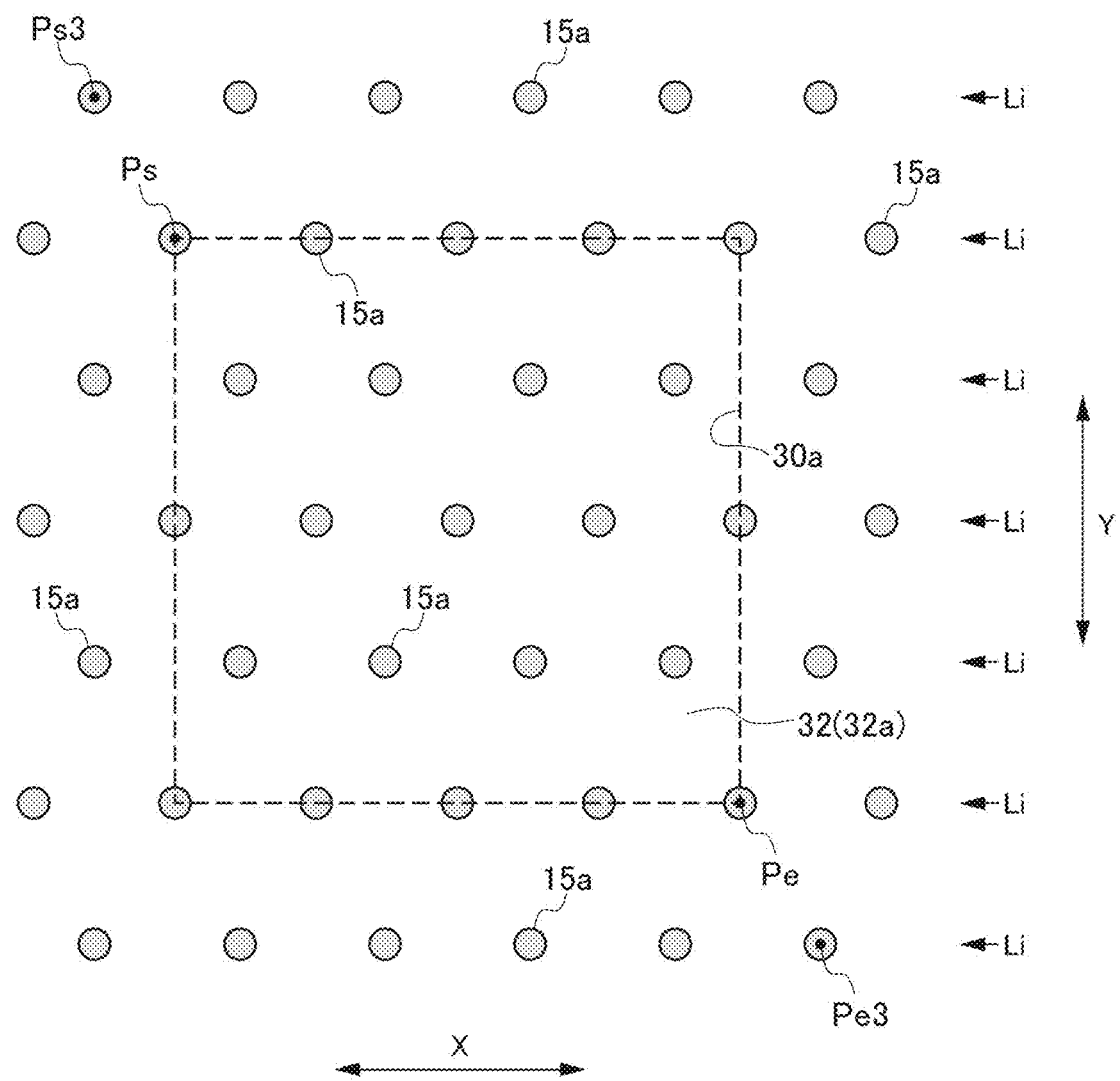
FIG. 16 is a plan view schematically illustrating irradiation positions of an electron beam according to a fifth embodiment of the present invention.

FIG. 16 is a plan view schematically illustrating irradiation positions of an electron beam according to the fifth embodiment of the present invention.

First, for comparison with the fifth embodiment of the present invention, the preheating pattern in the first stage of the first embodiment (see FIG. 4) will be described.

In the first embodiment, the center of each beam spot 15a on the outer side as viewed from the center of the opening 30a of the electron shield 30 is located at the edge of the opening 30a.

On the other hand, in the fifth embodiment of the present invention, as illustrated in FIG. 16, the center of each beam spot 15a on the outer side as viewed from the center of the opening 30a of the electron shield 30 is located outside the edge of the opening 30a, that is, in the region of the shield portion 30b (see FIG. 1).

When the irradiation area of the electron beam 15 is enlarged in this manner, the time required for moving the irradiation position (beam spot 15a) of the electron beam 15 from a start point Ps3 to an end point Pe3 according to a preheating pattern illustrated in FIG. 16 becomes long. Therefore, when the irradiation position of the electron beam 15 is moved from the start point Ps3 to the end point Pe3 and this moving operation is repeated a plurality of times, the time from when the irradiation position of the electron beam 15 starts to move from the start point Ps3 to when it returns to the start point Ps3 again, that is, the repetition period becomes long. Therefore, when the beam irradiation position is moved from the start point Ps, which is the start point of substantial preheating, to the end point Pe, which is the end point of the substantial preheating, it is possible to secure a long time for dissipating electric charges accumulated in the powder particles at each beam irradiation position. As a result, the risk of occurrence of smoke due to accumulation of electric charges can be reduced.

In the fifth embodiment, the preheating pattern in the first stage of the first embodiment has been described as a comparative example. However, the irradiation area of the electron beam 15 may be enlarged similarly to the fifth embodiment even in the second and subsequent stages of the first embodiment. The fifth embodiment is also applicable to the second embodiment to the fourth embodiment.

Sixth Embodiment

Next, a sixth embodiment of the present invention will be described.

The sixth embodiment of the present invention is different from the above-described embodiments in a system of moving the electron beam 15 in the X direction. Specifically, in the above-described embodiments, a system is adopted in which the control unit 50 intermittently moves the irradiation position of the electron beam 15 in the X direction by repeating movement and stop of the electron beam 15 in each line L1. On the other hand, in the sixth embodiment, a system is adopted in which the electron beam 15 is moved at a constant speed without being stopped in each line L1, that is, the irradiation position of the electron beam 15 is continuously moved in the X direction. Details will be described below.

Figure 17:
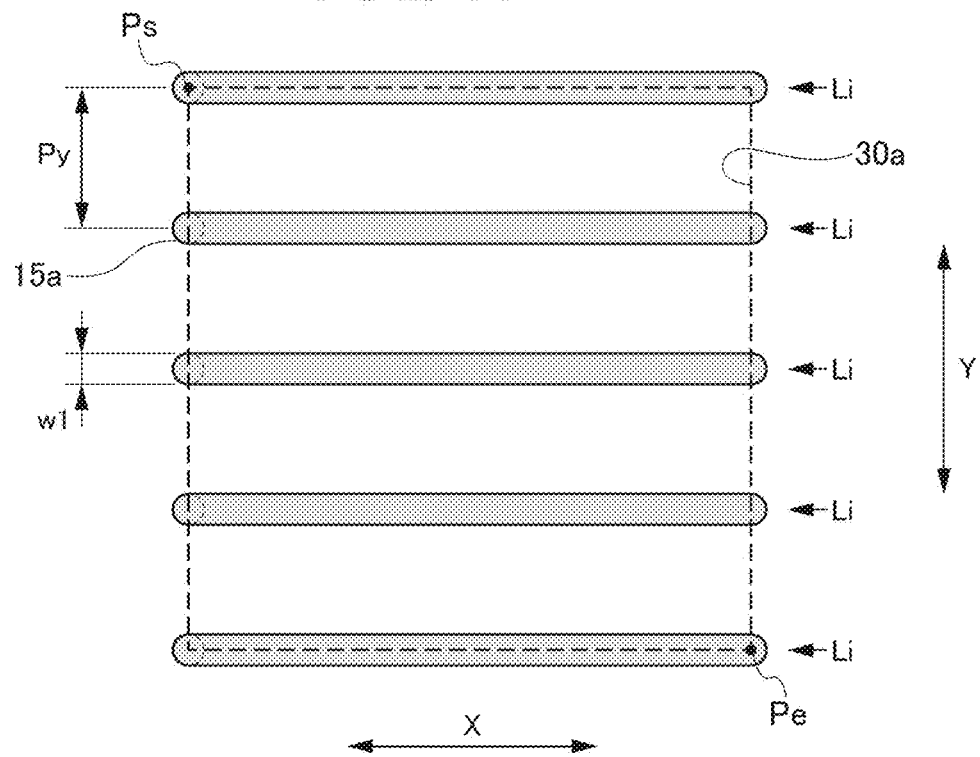
FIG. 17 is a plan view schematically illustrating irradiation positions of an electron beam in a first stage according to a sixth embodiment of the present invention.

FIG. 17 is a plan view schematically illustrating irradiation positions of an electron beam in a first stage according to the sixth embodiment of the present invention.

In the first stage illustrated in FIG. 17, the control unit 50 divides the irradiation positions of the electron beam 15 into the plurality of lines L1 in the Y direction, and moves the irradiation position of the electron beam 15 from one end to the other end in the X direction for each line L1. In addition, the control unit 50 continuously moves the beam spot 15a of the electron beam 15 in the X direction in each line L1. Furthermore, the control unit 50 sets a beam width and the irradiation positions of the electron beam 15 such that the lines L1 of the electron beam 15 do not overlap each other. More specifically, the interval Py between the beam spots 15a in the Y direction is set to be equal to or larger than the beam width (w1 illustrated in FIG. 17) of each electron beam 15 so that the two lines L1 adjacent to each other in the Y direction do not overlap each other. The beam width of the electron beam 15 corresponds to the beam size of the electron beam 15, and is determined by the diameter of a spot (beam spot 15a illustrated in FIG. 17) of the electron beam 15 with which the powder layer 32a is irradiated. In addition, in the first stage, the control unit 50 controls the beam irradiation apparatus 14 to move the irradiation position of the electron beam 15 from the start point Ps to the end point Pe according to a preheating pattern illustrated in FIG. 17 and to repeat this moving operation a predetermined number of times.

Figure 18:
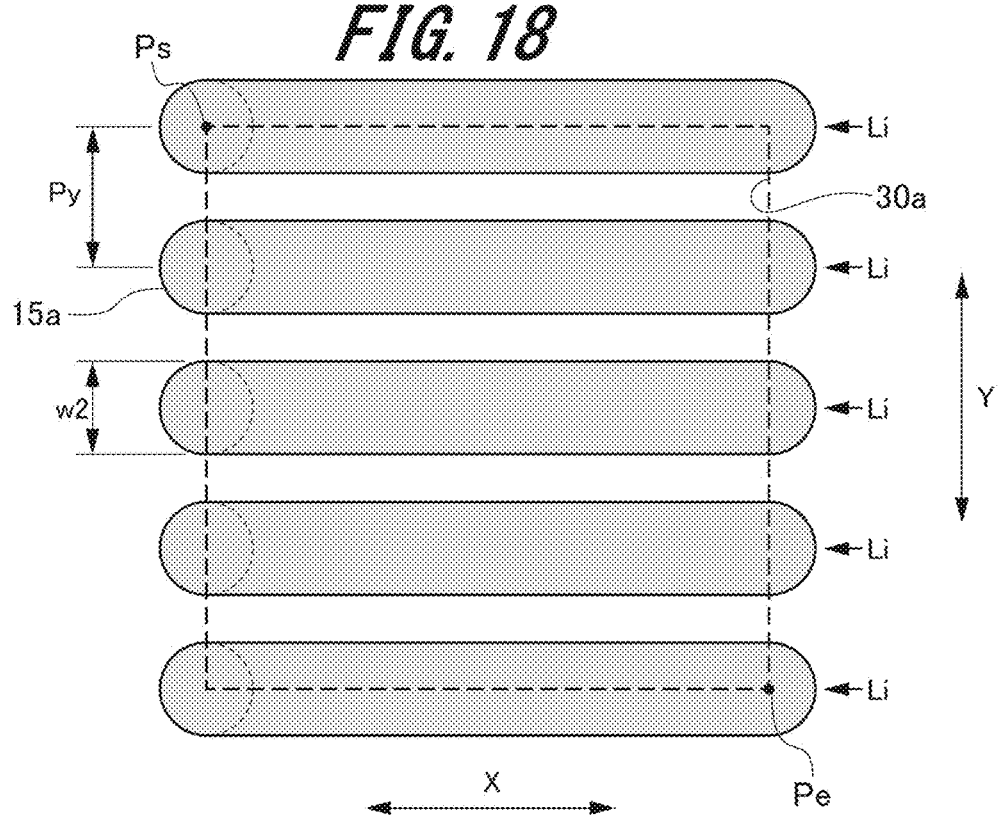
FIG. 18 is a plan view schematically illustrating irradiation positions of an electron beam in a second stage according to the sixth embodiment of the present invention.

FIG. 18 is a plan view schematically illustrating irradiation positions of an electron beam in a second stage according to the sixth embodiment of the present invention.

In the second stage, the control unit 50 sets the beam width of the electron beam 15 to w2 larger than w1 described above in comparison with the first stage. Then, under the setting of the beam width=w2, the control unit 50 controls the beam irradiation apparatus 14 to move the irradiation position of the electron beam 15 from the start point Ps to the end point Pe according to a preheating pattern illustrated in FIG. 18 and to repeat this moving operation a predetermined number of times. In the second stage illustrated in FIG. 18, the control unit 50 sets the beam width and the irradiation positions of the electron beam 15 such that the lines L1 of the electron beam 15 do not overlap each other. More specifically, the interval Py of the beam spots 15a in the Y direction is set to be equal to or larger than the beam width (w2 illustrated in FIG. 18) of each electron beam 15 so that the two lines L1 adjacent to each other in the Y direction do not overlap each other. Furthermore, the interval Py between the beam spots 15a is set to be the same as that in the case of the first stage.

Figure 19:
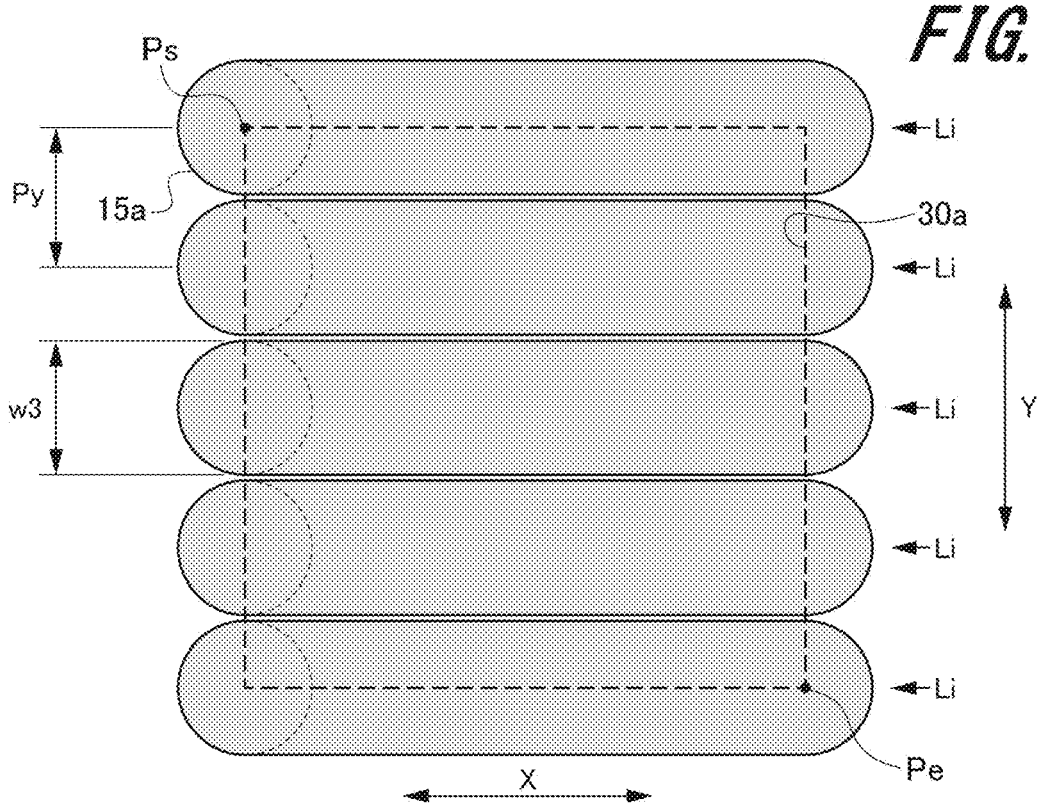
FIG. 19 is a plan view schematically illustrating irradiation positions of an electron beam in a third stage according to the sixth embodiment of the present invention.

FIG. 19 is a plan view schematically illustrating irradiation positions of an electron beam in a third stage according to the sixth embodiment of the present invention.

In the third stage, the control unit 50 sets the beam width of the electron beam 15 to w3 larger than w2 described above in comparison with the second stage. Then, under the setting of the beam width=w3, the control unit 50 controls the beam irradiation apparatus 14 to move the irradiation position of the electron beam 15 from the start point Ps to the end point Pe according to a preheating pattern illustrated in FIG. 19 and to repeat this moving operation a predetermined number of times. In the third stage illustrated in FIG. 19, the control unit 50 sets the beam width and the irradiation positions of the electron beam 15 such that the lines L1 of the electron beam 15 do not overlap each other. More specifically, the interval Py of the beam spots 15a in the Y direction is set to be equal to or larger than the beam width (w3 illustrated in FIG. 19) of each electron beam 15 so that the two lines L1 adjacent to each other in the Y direction do not overlap each other. Furthermore, the interval Py between the beam spots 15a is set to be the same as that in the case of the first stage.

Figure 20:
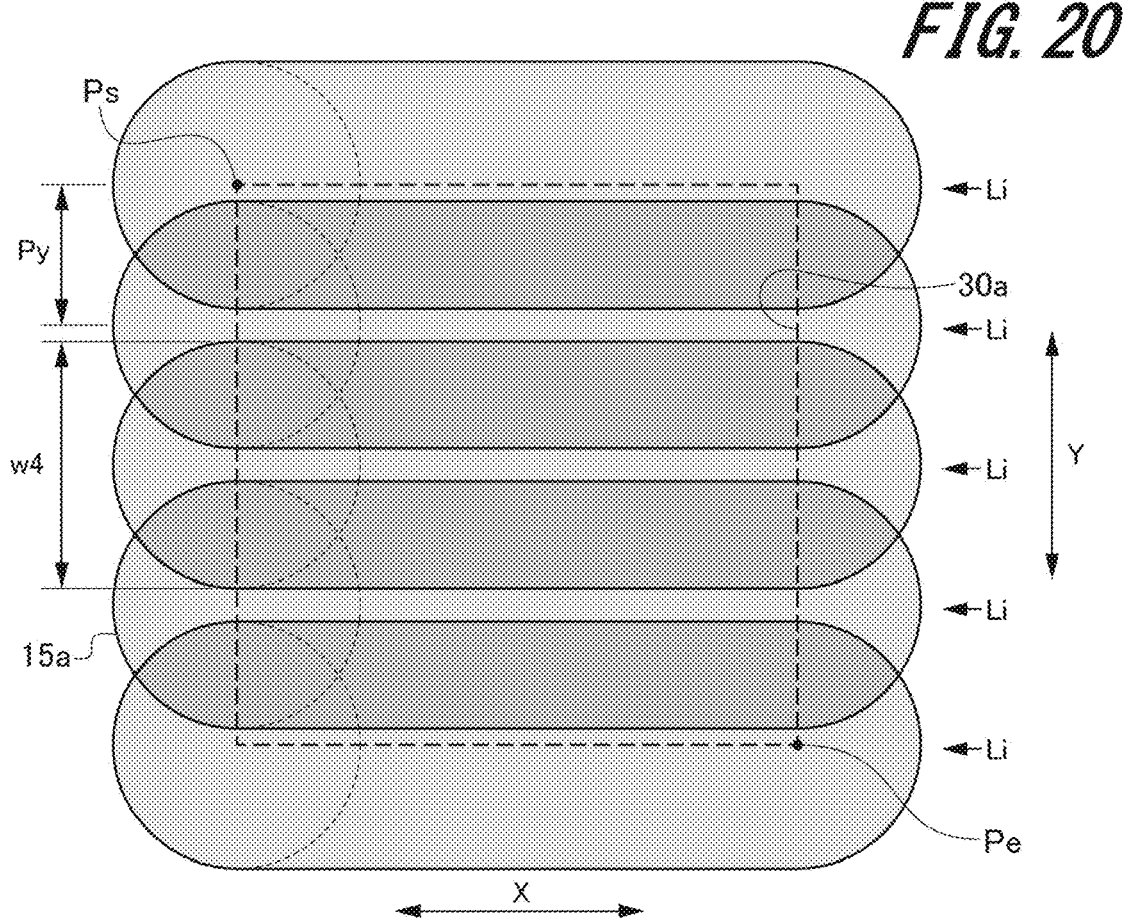
FIG. 20 is a plan view schematically illustrating irradiation positions of an electron beam in a fourth stage according to the sixth embodiment of the present invention.

FIG. 20 is a plan view schematically illustrating irradiation positions of an electron beam in a fourth stage according to the sixth embodiment of the present invention.

In the fourth stage, the control unit 50 sets the beam width of the electron beam 15 to w4 larger than w3 described above in comparison with the third stage. Then, under the setting of the beam width=w4, the control unit 50 controls the beam irradiation apparatus 14 to move the irradiation position of the electron beam 15 from the start point Ps to the end point Pe according to a preheating pattern illustrated in FIG. 20 and to repeat this moving operation a predetermined number of times. In the fourth stage illustrated in FIG. 20, the control unit 50 sets the beam width and the irradiation positions of the electron beam 15 such that the lines L1 of the electron beam 15 overlap each other. More specifically, the interval Py of the beam spots 15a in the Y direction is set to be smaller than the beam width (w4 illustrated in FIG. 20) of each electron beam 15. As a result, the two lines L1 adjacent to each other in the Y direction partially overlap each other. Furthermore, the interval Py between the beam spots 15a is set to be the same as that in the case of the first stage. That is, the interval Py between the beam spots 15a are constant from the start of preheating to the end of preheating.

As described above, in the sixth embodiment of the present invention, the control unit 50 sets the beam width and the irradiation positions of the electron beam 15 such that the lines L1 of the electron beam 15 do not overlap each other in the first stage including the start of preheating and the subsequent second and third stages. This makes it possible to increase the temperature of the powder layer 32a while suppressing the occurrence of smoke. In addition, the control unit 50 controls the beam irradiation apparatus 14 to gradually increase the beam width of the electron beam 15 from the start of preheating in the first stage to the end of preheating in the fourth stage. As a result, the preheating in the fourth stage can be performed in a state where the temporary sintering of the powder layer 32a has progressed to some extent by the preheating from the first stage to the third stage. Therefore, even if the electron beam 15 is emitted such that the lines L1 of the electron beam 15 overlap each other in the fourth stage, the occurrence of smoke can be suppressed.

In addition, by setting the beam width of the electron beam 15 to be large as w4 in the final fourth stage, the powder layer 32a can be heated to a uniform temperature. As a result, the risk of occurrence of smoke can be reduced, and the temperature distribution of the powder layer 32a can be made uniform.

In the sixth embodiment, the beam current of the electron beam 15 may be changed similarly to the second embodiment and the third embodiment described above.

In addition, in the sixth embodiment, as in the above-described fourth embodiment, an irradiation position of the electron beam 15 applied when the first powder layer 32a is preheated and an irradiation position of the electron beam 15 applied when the second powder layer 32a is preheated, may be set to be shifted in a direction orthogonal to the layering direction. However, in the sixth embodiment, since the irradiation position of the electron beam 15 is continuously moved in the X direction, the direction in which the beam irradiation position is shifted is limited to the Y direction.

Furthermore, in the first embodiment and the second embodiment described above, the interval Px between the beam spots 15a in the X direction and the interval Py between the beam spots 15a in the Y direction are both set to be equal to or larger than the beam diameter of the electron beam 15 so that the beam spots 15a do not overlap each other in the first stage including the start of preheating and the subsequent second and third stages, but the present invention is not limited thereto. For example, even when the interval Px between the beam spots 15a in the X direction is set to be smaller than the beam diameter and the interval Py between the beam spots 15a in the Y direction is set to be equal to or larger than the beam diameter, overlapping each other of the lines L1 of the electron beam 15 can be avoided. Even in this case, similarly to the above-described embodiments, the risk of occurrence of smoke can be reduced, and the temperature distribution of the powder layer 32a can be made uniform.

Furthermore, in the first embodiment and the second embodiment described above, the lines L1 of the electron beam 15 overlap each other in the final stage (fourth stage). However, the lines L1 of the electron beam 15 may overlap each other in a stage before the final stage, and the overlapping area may be larger in the final stage than in a stage before the final stage. That is, the control unit 50 may control the beam irradiation apparatus 14 to overlap the lines L1 each other in any stage of the second and subsequent stages and to gradually increase the overlapping area of the lines L1 in the subsequent stage.

Furthermore, in the above-described embodiments, the case where the control unit 50 changes the beam current and the beam size from the start of preheating to the end of preheating has been described. However, in addition to these control parameters, at least one of a scan speed and a scan area may be changed in each stage.

When the irradiation position of the electron beam 15 is intermittently moved in the X direction, the scan speed is determined by the time for which the beam spot 15a stays (stops) at each irradiation position of the electron beam 15. Specifically, the longer the stay time of the beam spot 15a, the slower the scan speed, and the shorter the stay time of the beam spot 15a, the faster the scan speed. When the irradiation position of the electron beam 15 is continuously moved in the X direction, the moving speed of the electron beam 15 is the scan speed. When the scan speed is changed, the time until the irradiation position of the electron beam 15 returns to the original position (scan cycle) becomes shorter as the scan speed is faster, and the time until the irradiation position of the electron beam 15 returns to the original position becomes longer as the scan speed is slower. In contrast, smoke is likely to occur when the scan speed is too fast or too slow. Therefore, in order to suppress the occurrence of smoke, it is necessary to appropriately set the scan speed. Furthermore, in the three-dimensional PBF-AM, a layer in which smoke is likely to occur and a layer in which smoke is unlikely to occur may be mixed. Therefore, in the layer in which smoke is unlikely to occur, the scan speed is made faster than in the layer in which smoke is likely to occur, so that the time required for preheating the powder layer 32a can be shortened. In addition, even in the same layer, smoke is more likely to occur in the first stage than in the later stages. Therefore, when the moving operation of the electron beam 15 is repeated for the same layer a predetermined number of times K (K is an integer of 2 or larger), the scan speed is increased in the second and subsequent moving operations as compared with the first moving operation, so that the time required for preheating the powder layer 32a can be shortened.

The scan area is determined by the area where the electron beam 15 is moved. For example, when the irradiation position of the electron beam 15 is moved from the start point Ps to the end point Pe as illustrated in FIG. 4, the scan area is an area surrounded by a broken line in FIG. 4. When the scan area is changed, the time until the irradiation position of the electron beam 15 returns to the original position becomes longer as the scan area is larger, and the time until the irradiation position of the electron beam 15 returns to the original position becomes shorter as the scan area is smaller. Therefore, in the layer where smoke is likely to occur, the occurrence of smoke can be suppressed by increasing the scan area. In the layer in which smoke is unlikely to occur, the time required for preheating the powder layer 32a can be shortened by reducing the scan area. In addition, even in the same layer, smoke is more likely to occur in the first stage than in the later stages. Therefore, when the moving operation of the electron beam 15 is repeated for the same layer a predetermined number of times K (K is an integer of 2 or larger), the occurrence of smoke is suppressed by increasing the scan area in the first moving operation, and the scan area is reduced as compared with the first movement operation in the second and subsequent moving operations, so that the time required for preheating the powder layer 32a can be shortened.

In the above-described embodiments, the preheating of the powder layer 32a may be ended when the temperature of the powder layer 32a reaches a predetermined temperature.

In the above-described embodiments, the preheating of the powder layer 32a is not limited to steps S6 and S13 in the three-dimensional PBF-AM process described above, and is also performed in step S9. Therefore, the preheating method according to each of the above-described embodiments can also be applied to step S9. The preheating of the powder layer 32a may be performed during the sintering step (steps S7 and S14) in the three-dimensional PBF-AM process described above. In the sintering step, when a plurality of build regions are present in the same powder layer 32a, the metal powder 32 in the first build region is sintered (melted and solidified) by irradiation with the electron beam 15, and then the metal powder 32 in the second build region is sintered by irradiation with the electron beam 15. At this time, even if the powder layer 32a is heated in advance in the preheating step (powder-heat step) before the sintering step, the temperature of the metal powder 32 in the second build region decreases while the metal powder 32 in the first build region is irradiated with the electron beam 15. Therefore, in order to recover the temperature of the metal powder 32 in the second build region, the powder layer 32a may be preheated. This preheating is also called inter-part heat. The preheating method according to each of the above-described embodiments is also applicable to the case of preheating the powder layer 32a in the sintering step (steps S7 and S14).

What is claimed is:

1. A three-dimensional powder bed fusion additive manufacturing (PBF-AM) apparatus comprising:
   a build plate;
   a powder application apparatus that applies metal powder onto the build plate to form a powder layer;
   a beam irradiation apparatus that irradiates the powder layer with an electron beam; and
   a control unit that controls the powder application apparatus and the beam irradiation apparatus, wherein
   when the powder layer is preheated by irradiation with the electron beam, the control unit sets a beam size and an irradiation position of the electron beam such that lines of the electron beam do not overlap each other at least at a start of preheating, and controls the beam irradiation apparatus to gradually increase the beam size of the electron beam from the start of preheating to an end of preheating.

2. The three-dimensional PBF-AM apparatus according to claim 1, wherein
   with respect to a first powder layer and a second powder layer layered at different positions in a layering direction, the control unit sets an irradiation position of the electron beam applied when the first powder layer is preheated and an irradiation position of the electron beam applied when the second powder layer is preheated, to be shifted in a direction orthogonal to the layering direction.

3. The three-dimensional PBF-AM apparatus according to claim 1, wherein
   the control unit sets the beam size and the irradiation position of the electron beam such that the lines of the electron beam overlap each other at least at the end of preheating.

4. The three-dimensional PBF-AM apparatus according to claim 1, wherein
   the control unit controls the beam irradiation apparatus to change at least one of a scan speed and a scan area of the electron beam in addition to the beam current and the beam size from the start of preheating to the end of preheating.

5. The three-dimensional PBF-AM apparatus according to claim 1, comprising
   an electron shield that has at least an opening and a shield portion, wherein the electron shield exposes the metal powder applied onto the build plate by the opening and shields the metal powder located outside the opening by the shield portion, wherein when the powder layer is preheated by irradiation with the electron beam, the control unit controls the beam irradiation apparatus to irradiate a wider area than the opening of the electron shield with the electron beam.

6. The three-dimensional PBF-AM apparatus according to claim 1, wherein when the powder layer is preheated by irradiation with the electron beam, the control unit intermittently moves an irradiation position of the electron beam in a first direction, and sets a beam diameter and an irradiation position of the electron beam such that spots of the electron beam do not overlap in a second direction orthogonal to the first direction at least at the start of preheating.

7. The three-dimensional PBF-AM apparatus according to claim 6, wherein the control unit sets an interval between the spots in the second direction to be equal to or larger than the beam diameter.

8. The three-dimensional PBF-AM apparatus according to claim 6, wherein the control unit sets the beam diameter and the irradiation position of the electron beam such that the spots of the electron beam do not overlap each other in the first direction or the second direction at least at the start of preheating.

9. The three-dimensional PBF-AM apparatus according to claim 8, wherein the control unit sets an interval between the spots in the first direction to be equal to or larger than the beam diameter.

10. The three-dimensional PBF-AM apparatus according to claim 1, wherein when the powder layer is preheated by irradiation with the electron beam, the control unit continuously moves the irradiation position of the electron beam in a first direction, and sets a beam width and the irradiation position of the electron beam such that lines of the electron beam do not overlap in a second direction orthogonal to the first direction at least at the start of preheating.

11. The three-dimensional PBF-AM apparatus according to claim 10, wherein the control unit sets an interval between spots of the electron beam in the second direction to be equal to or larger than the beam width.

12. A three-dimensional powder bed fusion additive manufacturing method comprising:

when a powder layer formed by applying metal powder onto a build plate is preheated by irradiation with an electron beam, setting a beam size and an irradiation position of the electron beam such that lines of the electron beam do not overlap each other at least at a start of preheating, and controlling the electron beam to gradually increase the beam size of the electron beam from the start of preheating to an end of preheating.

* * * * *